(12) United States Patent
Abouelseoud et al.

(10) Patent No.: US 11,665,626 B2
(45) Date of Patent: May 30, 2023

(54) MULTI-BAND MILLIMETER WAVE NETWORK DISCOVERY

(71) Applicant: SONY GROUP CORPORATION, Tokyo (JP)

(72) Inventors: Mohamed Abouelseoud, Burlingame, CA (US); Ramy Abdallah, San Jose, CA (US); Kazuyuki Sakoda, Campbell, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/812,619

(22) Filed: Jul. 14, 2022

(65) Prior Publication Data

US 2022/0353791 A1 Nov. 3, 2022

Related U.S. Application Data

(63) Continuation of application No. 16/776,166, filed on Jan. 29, 2020, now Pat. No. 11,432,228, which is a
(Continued)

(51) Int. Cl.
*H04W 72/04* (2023.01)
*H04W 48/10* (2009.01)
(Continued)

(52) U.S. Cl.
CPC .......... *H04W 48/10* (2013.01); *H04B 7/0617* (2013.01); *H04W 8/005* (2013.01);
(Continued)

(58) Field of Classification Search
CPC ..... H04W 48/10; H04W 8/005; H04W 12/06; H04W 16/10; H04W 16/28; H04W 16/30;
(Continued)

(56) References Cited

U.S. PATENT DOCUMENTS

| | | |
|---|---|---|
| 7,333,458 B2 | 2/2008 | Cain |
| 8,503,377 B2 | 8/2013 | Cordeiro |

(Continued)

FOREIGN PATENT DOCUMENTS

| | | |
|---|---|---|
| CN | 102215061 A | 10/2011 |
| CN | 102318392 A | 1/2012 |

(Continued)

OTHER PUBLICATIONS

Astudillo, Gabriel et al., "Neighbor discovery and routing schemes for mobile ad-hoc networks with bandwidth adaptive smart antennas", Telecommun Syst (2017) 66:17-27, published online Jan. 10, 2017.

(Continued)

*Primary Examiner* — Mahbubul Bar Chowdhury
(74) *Attorney, Agent, or Firm* — O'Banion & Ritchey LLP; John P. O'Banion

(57) ABSTRACT

Multi-band signaling is described for reducing signaling overhead in an apparatus and method for communications within a mesh network. The communications involve using two different beacon signals on two different communication channels. Peer beacons are sent using directional millimeter-wave (mmW) communications to provide time synchronization and resource management information to maintain existing links among one or more neighboring peer stations. A separate network discovery beacon is sent over a sub-6 GHz communication channel, to provide mesh network profile information that identifies the mesh network to aid network discovery for wireless communication stations wanting to join the mesh network.

20 Claims, 24 Drawing Sheets

Related U.S. Application Data continuation of application No. 15/828,687, filed on Dec. 1, 2017, now Pat. No. 10,575,240.

(60) Provisional application No. 62/557,232, filed on Sep. 12, 2017.

(51) Int. Cl.

| | | |
|---|---|---|
| *H04W 40/24* | (2009.01) | |
| *H04W 72/044* | (2023.01) | |
| *H04W 16/10* | (2009.01) | |
| *H04B 7/06* | (2006.01) | |
| *H04W 8/00* | (2009.01) | |
| *H04W 12/06* | (2021.01) | |
| *H04W 16/28* | (2009.01) | |
| *H04W 16/30* | (2009.01) | |
| *H04W 24/02* | (2009.01) | |
| *H04W 24/10* | (2009.01) | |
| *H04W 88/10* | (2009.01) | |
| *H04W 84/18* | (2009.01) | |
| *H04W 88/06* | (2009.01) | |
| *H04W 88/04* | (2009.01) | |

(52) U.S. Cl.
CPC ........... *H04W 12/06* (2013.01); *H04W 16/10* (2013.01); *H04W 16/28* (2013.01); *H04W 40/246* (2013.01); *H04W 72/046* (2013.01); *H04W 72/0413* (2013.01); *H04W 16/30* (2013.01); *H04W 24/02* (2013.01); *H04W 24/10* (2013.01); *H04W 84/18* (2013.01); *H04W 88/04* (2013.01); *H04W 88/06* (2013.01); *H04W 88/10* (2013.01)

(58) Field of Classification Search
CPC ........... H04W 40/246; H04W 72/0413; H04W 72/046; H04W 24/02; H04W 24/10; H04W 84/18; H04W 88/04; H04W 88/06; H04W 88/10; H04W 40/244; H04B 7/0617

See application file for complete search history.

(56) References Cited

U.S. PATENT DOCUMENTS

| | | |
|---|---|---|
| 8,755,302 B2 | 6/2014 | Shao |
| 9,258,046 B2 | 2/2016 | Sinha |
| 9,295,033 B2 | 3/2016 | Quan |
| 10,742,299 B2 | 8/2020 | Abouelseoud |
| 2006/0215624 A1 | 9/2006 | Adya |
| 2007/0011435 A1 | 1/2007 | Lee |
| 2008/0175197 A1 | 7/2008 | Shao |
| 2010/0110981 A1 | 5/2010 | Shao |
| 2010/0214169 A1 | 8/2010 | Kafle |
| 2011/0069636 A1 | 3/2011 | Shao |
| 2011/0199918 A1 | 8/2011 | Sampath |
| 2011/0205969 A1 | 8/2011 | Ahmad |
| 2011/0299422 A1 | 12/2011 | Kim |
| 2012/0026941 A1 | 2/2012 | Ahmad |
| 2012/0057580 A1 | 3/2012 | Hansen |
| 2015/0131481 A1 | 5/2015 | Lagrange |
| 2015/0189545 A1 | 7/2015 | Morita |
| 2015/0201368 A1 | 7/2015 | Cudak |
| 2015/0237548 A1 | 8/2015 | Luo |
| 2015/0289147 A1 | 10/2015 | Lou |
| 2015/0319700 A1 | 11/2015 | Oteri |
| 2015/0351135 A1 | 12/2015 | Schmidt |
| 2015/0365155 A1 | 12/2015 | Subramanian |
| 2015/0373572 A1 | 12/2015 | Sahin |
| 2015/0373618 A1 | 12/2015 | Deenoo |
| 2015/0382171 A1 | 12/2015 | Roy |
| 2016/0044711 A1 | 2/2016 | Lou |
| 2016/0191132 A1 | 6/2016 | Rajagopal |
| 2016/0192395 A1 | 6/2016 | Yoo |
| 2016/0255660 A1 | 9/2016 | Son |
| 2016/0269137 A1 | 9/2016 | Lindoff |
| 2016/0380685 A1 | 12/2016 | Kasher |
| 2017/0064583 A1 | 3/2017 | Roy |
| 2017/0086211 A1 | 3/2017 | Sahin |
| 2017/0180025 A1 | 6/2017 | Cariou |
| 2017/0223587 A1 | 8/2017 | Trainin |
| 2017/0223744 A1 | 8/2017 | Qian |
| 2017/0346525 A1 | 11/2017 | Stirling-Gallacher |
| 2018/0098366 A1 | 4/2018 | Cohn |
| 2018/0115994 A1 | 4/2018 | Islam |
| 2018/0123660 A1 | 5/2018 | Jung |
| 2018/0199324 A1 | 7/2018 | Sun |
| 2018/0206139 A1 | 7/2018 | Wang |
| 2018/0331914 A1 | 11/2018 | Yoshida |
| 2018/0343605 A1 | 11/2018 | Wu |
| 2019/0007822 A1 | 1/2019 | Wee |
| 2019/0045520 A1 | 2/2019 | Venkatachalam Jayaraman |
| 2019/0075607 A1 | 3/2019 | Park |
| 2019/0104546 A1 | 4/2019 | Chendamarai Kannan |
| 2019/0208540 A1 | 7/2019 | Kim |

FOREIGN PATENT DOCUMENTS

| | | |
|---|---|---|
| CN | 103348757 A | 10/2013 |
| CN | 104982049 A | 10/2015 |
| CN | 105052235 A | 11/2015 |
| CN | 105722051 A | 6/2016 |
| CN | 105981310 A | 9/2016 |
| CN | 107949057 A | 4/2018 |
| EP | 2104245 A1 | 9/2009 |
| EP | 3046378 | 7/2016 |
| JP | 2012503944 A | 2/2012 |
| JP | 2012199680 A | 10/2012 |
| JP | 2013520937 A | 6/2013 |
| JP | 2014520445 A | 8/2014 |
| JP | 2016511585 A | 4/2016 |
| JP | 2017188836 A | 10/2017 |
| KR | 20080088572 A | 10/2008 |
| KR | 20120100895 A | 9/2012 |
| KR | 20150117288 A | 10/2015 |
| WO | 2014124048 | 8/2014 |
| WO | 2015138914 | 9/2015 |
| WO | 2015138914 A1 | 9/2015 |
| WO | 2016065068 | 4/2016 |
| WO | 2016065068 A2 | 4/2016 |
| WO | 2016086144 | 6/2016 |
| WO | 2016126338 A1 | 8/2016 |
| WO | 2016210302 | 12/2016 |
| WO | 2017063496 | 4/2017 |
| WO | 2017095613 | 6/2017 |

OTHER PUBLICATIONS

China National Intellecutal Property Administration (CNIPA), Notification of the First Office Action dated Jan. 29, 2022, English-language translation, related Chinese Patent Application No. 201880056135.6, pp. 1-9.

China Patent Office, Official Action dated Oct. 11, 2021, related Chinese patent application No. 201880081476.9, pp. 1-10, English-language translation, pp. 11-20, claims, pp. 21-26.

Deng, Junquan et al., Resource Allocation and Interference Management for Opportunistic Relaying in Integrated mmWave/sub-6GHz 5G Networks, IEEE Communications Magazine, vol. 55, Issue 6, Jun. 12, 2017, pp. 94-101.

ISA/EP, European Patent Office (EPO), International Search Report and Written Opinion dated Apr. 5, 2019, related PCT international application No. PCT/IB2018/060465, pp. 1-17, claims searched, pp. 18-23.

ISA/EP, European Patent Office (EPO), International Search Report and Written opinion dated Dec. 3, 2019, related PCT international application No. PCT/IB2019/056730, pp. 1-13, claims searched, pp. 14-19.

ISA/EP, European Patent Office (EPO), International Search Report and Written Opinion dated Nov. 23, 2018, related PCT international

(56) References Cited

OTHER PUBLICATIONS application No. PCT/IB2018/056562, pp. 1-20, claims searched, pp. 21-27.

ISA/EPO, International Search Report and Written Opinion dated Dec. 17, 2018, related PCT international application No. PCT/IB2018/057374, pp. 1-1, claims searched, pp. 16-21.

Park, Hyunhee et al., "Multi-band Directional Neighbor Discovery in Self-Organized mmWave ad-hoc Networks", IEEE Transactions on Vehicular Technology, vol. 64, Issue 3, Mar. 2015, published Jun. 5, 2014, pp. 1143-1155.

Shokri-Ghadikolaei, Hossein et al., "Milimeter Wave Ad Hoc Networks: Noise-limited or Interference-limited?", 2015 IEEE Globecom Workshops (GCW kshps), Feb. 25, 2016, pp. 1-7.

Taiwan Patent Office, Official Action dated May 17, 2019, related Taiwan patent application No. 107130827, pp. 1-11, English-language translation, pp. 12-21, claims examined, pp. 22-18.

Wang, Liang-min et al., "Overview of Internet of vehicles for 5G", Chinese Journal of Network and Information Security, Issue 06, Jun. 2016, pp. 1-21.

Zou Ning, "Information Technology and Standardization", Issue 03, IEEE 802.11ad Standard and Application, Mar. 10, 2013, pp. 1-13.

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|

Octets:  2          2          6    6    3         3              4

FIG. 7
(Prior Art)

| B0 | B1  B9 | B10  B15 | B16  B17 | B18  B23 |
|---|---|---|---|---|
| Direction | CDOWN | Sector ID | DMG Antenna ID | RXSS Length |

Bits:  1          9              6              2              6

FIG. 8
(Prior Art)

| B0  B8 | B9  B10 | B11  B15 | B16 | B17  B23 |
|---|---|---|---|---|
| Total sectors in ISS | Number of RX DMG antennas | Reserved | Poll Required | Reserved |

Bits:  9          2              5              1              7

FIG. 9A
(Prior Art)

| B0  B5 | B6  B7 | B8  B15 | B16 | B17  B23 |
|---|---|---|---|---|
| Sector select | DMG Antenna select | SNR report | Poll Required | Reserved |

Bits:  6          2              8              1              7

FIG. 9B
(Prior Art)

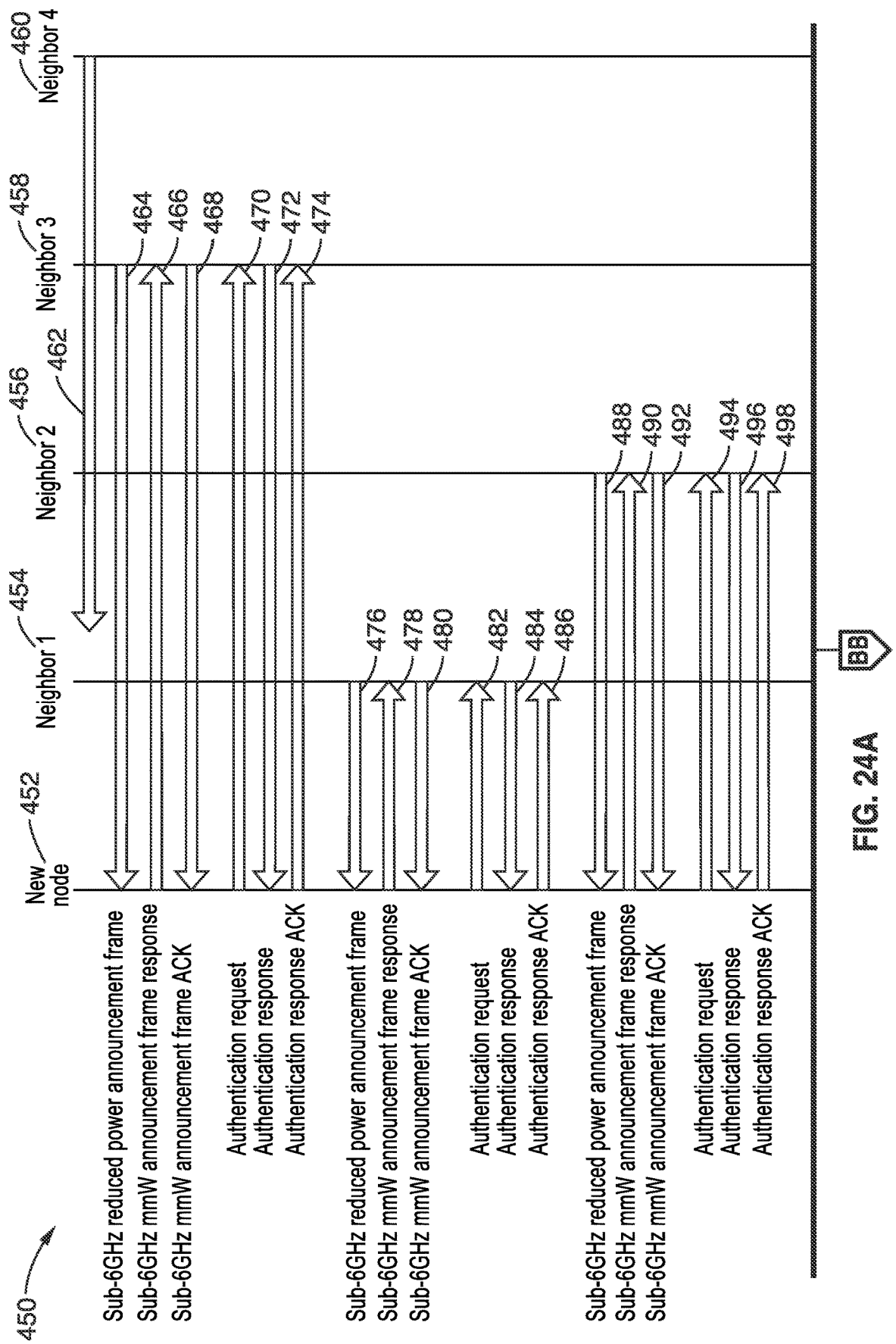

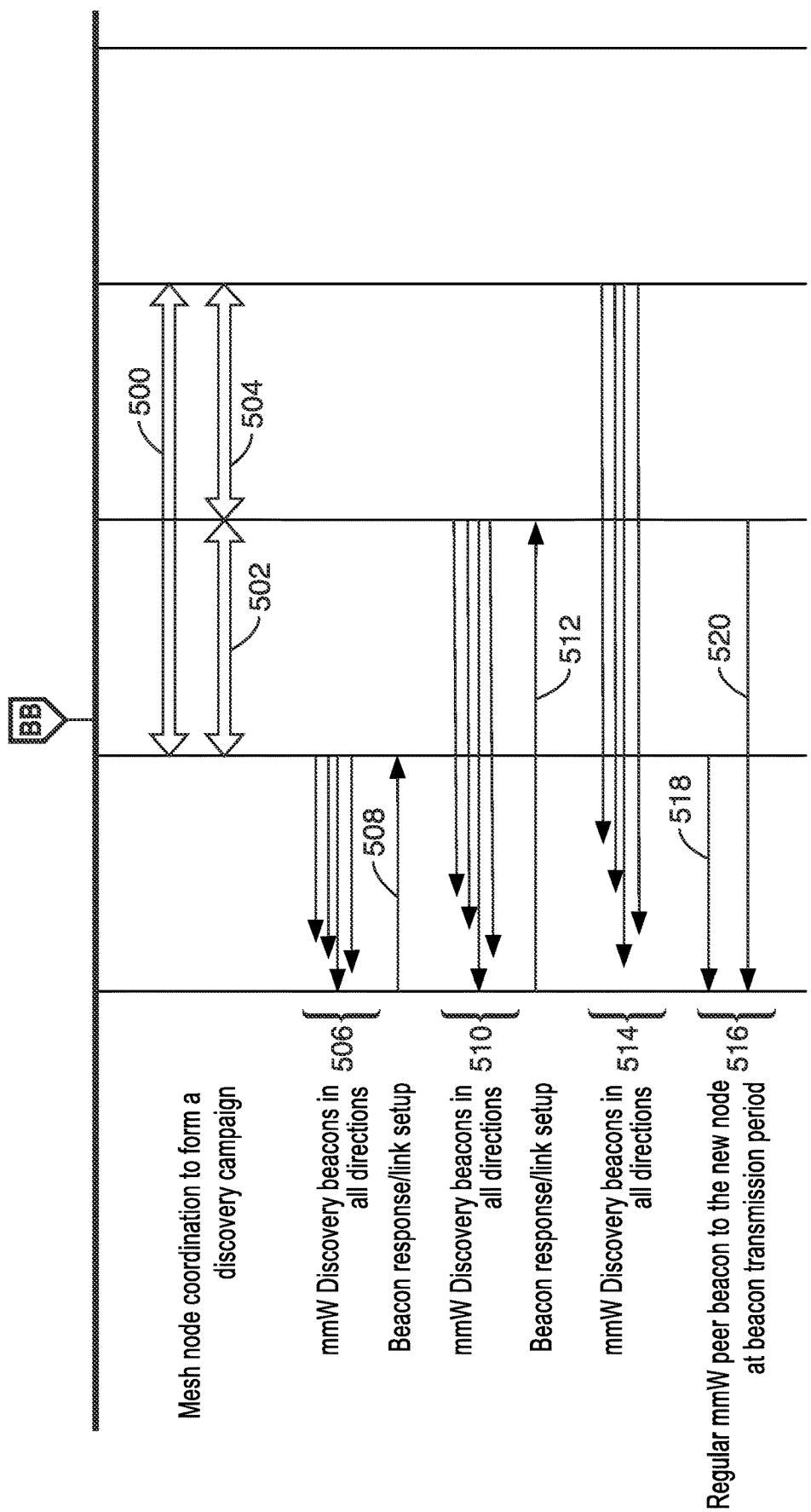

MULTI-BAND MILLIMETER WAVE NETWORK DISCOVERY

CROSS-REFERENCE TO RELATED APPLICATIONS

This application is a continuation of U.S. patent application Ser. No. 16/776,166 filed on Jan. 29, 2020, incorporated herein by reference in its entirety, which is a continuation of U.S. patent application Ser. No. 15/828,687 filed on Dec. 1, 2017, now U.S. Ser. No. 10/575,240, incorporated herein by reference in its entirety, which claims priority to, and the benefit of, U.S. provisional patent application Ser. No. 62/557,232 filed on Sep. 12, 2017, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless communications between stations, and more particularly to utilizing multiple-bands for communicating network announcements and maintaining peer communications.

2. Background Discussion

Millimeter wavelength (mm-wave or mmW) wireless networks, including mesh networks and mixtures of mesh and non-mesh networks, are becoming increasingly important. Due to the need of higher capacity, network operators have begun to embrace concepts to achieve densification. Use of current sub-6 GHz wireless technology is not sufficient to cope with high data demands. One alternative is to utilize additional spectrum in the 30-300 GHz band, millimeter wave band (mmW).

Enabling mmW wireless systems in general requires properly dealing with the channel impairments and propagation characteristics of the high frequency bands. High free-space path loss, high penetration, reflection and diffraction losses reduce the available diversity and limit non-line-of-sight (NLOS) communications. The small wavelength of mmW enables the use of high-gain electronically steerable directional antennas of practical dimensions. This can provide enough array gain to overcome path loss and ensure high Signal-to-Noise Ratio (SNR) at the receiver. Directional mesh networks in dense deployment environments using mmW bands are an efficient way to achieve reliable communications between nodes and overcome line-of-sight channel restrictions.

A new station node starting up will be looking for neighboring nodes to discover and a network to join. The process of initial access of a node to a network comprises scanning for neighboring nodes and discovering all active nodes in the local vicinity. This can be performed either through the new node searching for a specific network/list of networks to join, or by the new node sending a broadcast request to join any already established network that will accept the new node.

A node connecting to a mesh network needs to discover neighboring nodes to decide on the best way to reach a gateway/portal mesh nodes and the capabilities of each of these neighboring nodes. The new node examines every channel for possible neighboring nodes for a specific period of time. If no active node is detected after that specific time, the new node moves to test the next channel. When a node is detected, the new node collects sufficient information to configure its PHY layer for operation in the regulatory domain (IEEE, FCC, ETSI, MKK, etc.). This task is further challenging in mmWave communications due to directional transmissions. The challenges in this process can be summarized as: (a) knowledge of surrounding nodes IDs; (b) knowledge of best transmission pattern for beamforming; (c) channel access issues due to collisions and deafness; and (d) channel impairments due to blockage and reflections. Designing a neighborhood discovery method to overcome some or all of the above is of utmost importance to enable pervasiveness of mmWave D2D and mesh technologies.

Most existing technologies for mesh networking address mesh discovery solutions for networks operating in broadcast mode and is not targeted to networks with directional wireless communications. In addition, those technologies which utilize directional wireless network communications often have very high overhead demands in regards to the generation of beacon signals.

Accordingly, a need exists for enhanced mechanisms for announcement and beaconing within a mmWave network. The present disclosure fulfills that need and provides additional benefits over previous technologies.

BRIEF SUMMARY

A system, apparatus, and/or method for establishing and maintaining mmWave communications in a mesh topology network without inducing significant signaling overhead or network discovery delay. In the disclosed technology, multiple-band communications are utilized toward reducing signaling overhead in mesh networks.

Each node in the mesh network comprises a wireless communication circuit configured for wirelessly communicating with other wireless communication stations utilizing both directional millimeter-wave (mmW) communication having a plurality of antenna pattern sectors each having different transmission directions, and sub-6 GHz wireless communication. The station programming can fulfill a number of roles, including a peer within a mesh network, or a new station seeking to join a mesh network. The station is configured for transmitting a peer beacon, using directional mmW with a multiple antenna pattern sectors. The peer beacon includes time synchronization and resource management information, which is communicated to one or more neighboring peer stations within the mesh network. The peer stations also transmit a network discovery beacons using sub-6 GHz wireless communication. The network discovery beacon contains mesh network profile information which identifies the mesh network, to aid network discovery for a new station to join the mesh network. Peer stations receive joining request frames via the sub-6 GHz wireless communication, in which the joining request announces the new station along with capabilities of the new station and a request from the new station to any receiving stations of the mesh network requesting assistance in both finding neighbors and joining the mesh network.

A number of terms are utilized in the disclosure whose meanings are generally described below.

A-BFT: Association-Beamforming Training period; a period announced in the beacons that is used for association and BF training of new stations (STAs) joining the network.

AP: Access Point; an entity that contains one station (STA) and provides access to the distribution services, through the wireless medium (WM) for associated STAs.

Beamforming (BF): a directional transmission that does not use an Omni-directional antenna pattern or quasi-Omni antenna pattern. Beamforming is used at a transmitter to improve received signal power or signal-to-noise ratio (SNR) at an intended receiver.

BSS: Basic Service Set; a set of stations (STAs) that have successfully synchronized with an AP in the network.

BI: the Beacon Interval is a cyclic super frame period that represents the time between beacon transmission times.

BRP: BF Refinement protocol; a BF protocol that enables receiver training and iteratively trains the transmitter and receiver sides to achieve the best possible directional communications.

BTI: Beacon Transmission Interval, is the interval between successive beacon transmissions.

CBAP: Contention-Based Access Period; the time period within the data transfer interval (DTI) of a directional multi-gigabit (DMG) BSS where contention-based enhanced distributed channel access (EDCA) is used.

DTI: Data Transfer Interval; the period whereby full BF training is permitted followed by actual data transfer. It can include one or more service periods (SPs) and contention-based access periods (CBAPs).

MAC address: a Medium Access Control (MAC) address.

MBSS: Mesh Basic Service Set, a basic service set (BSS) that forms a self-contained network of Mesh Stations (MSTAs), and which may be used as a distribution system (DS).

MCS: Modulation and Coding Scheme; defines an index that can be translated into the PHY layer data rate.

MSTA: Mesh Station (MSTA): a station (STA) that implements the Mesh facility. An MSTA that operates in the Mesh BSS may provide the distribution services for other MSTAs.

Omni-directional: a non-directional antenna mode of transmission.

Quasi-Omni directional: a directional multi-gigabit (DMG) antenna operating mode with the widest beamwidth attainable.

Receive sector sweep (RXSS): Reception of Sector Sweep (SSW) frames via different sectors, in which a sweep is performed between consecutive receptions.

RSSI: Receive Signal Strength Indicator (in dBm).

SLS: Sector-level Sweep phase: a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period; The SP that is scheduled by the access point (AP). Scheduled SPs start at fixed intervals of time.

Spectral efficiency: the information rate that can be transmitted over a given bandwidth in a specific communication system, usually expressed in bits per second, or in Hertz.

SSID: service Set Identifier; the name assigned to a WLAN network.

STA: Station; a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

Transmit Sector Sweep (TXSS): transmission of multiple Sector Sweep (SSW) or Directional Multi-gigabit (DMG) Beacon frames via different sectors, in which a sweep is performed between consecutive transmissions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a mesh configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIG. 24A and FIG. 24B is a message passing diagram for mesh coordinated mmW node discovery according to an embodiment of the present disclosure.

DETAILED DESCRIPTION

1. Existing Directional Wireless Network Technology
1.1. WLAN Systems

In WLAN systems, 802.11 defines two modes of scanning; passive and active scanning. The following are the characteristics of passive scanning. (a) A new station (STA), attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) STA moves to a channel, waits for incoming frames or a probe delay timer to expire. (a)(2) If no frame is detected after the timer expires, the channel is considered to be not in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (more rapid) for STAs to gain access to the network compared to the use of passive scanning, since STAs do not need to wait for beacons. (f) In infrastructure basic service set (BSS) and IBSS, at least one STA is awake to receive and respond to probes. (g) STAs in mesh basic service set (MBSS) might not be awake at any point of time to respond. (h) When radio measurement campaigns are active, nodes might not answer the probe requests. (i) Collision of probe responses can arise. STAs might coordinate the transmission of probe responses by allowing the STA that transmitted the last beacon to transmit the first Probe Response. Other nodes can follow and use back-off times and regular distributed coordination function (DCF) channel access to avoid collision.

Figure 1:
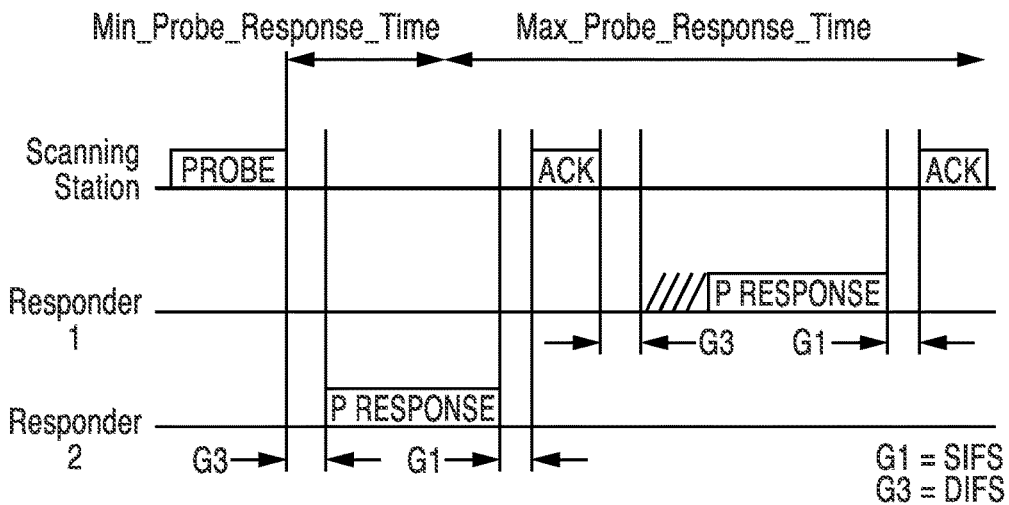
FIG. 1 is a timing diagram of active scanning performed in an IEEE 802.11 wireless local area network (WLAN).

FIG. 1 depicts the use of active scanning in an IEEE 802.11 WLAN, depicting a scanning station sending a probe and two responding stations which receive and respond to the probe. The figure also shows the minimum and maximum probe response timing. The values G1 is shown set to SIFS which is the interframe spacing prior to transmission of an acknowledgment, while G3 is DIFS which is DCF interframe spacing, represented the time delay for which a sender waits after completing a backoff period before sending an RTS package.

1.2. IEEE 802.11s mesh WLAN

The IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
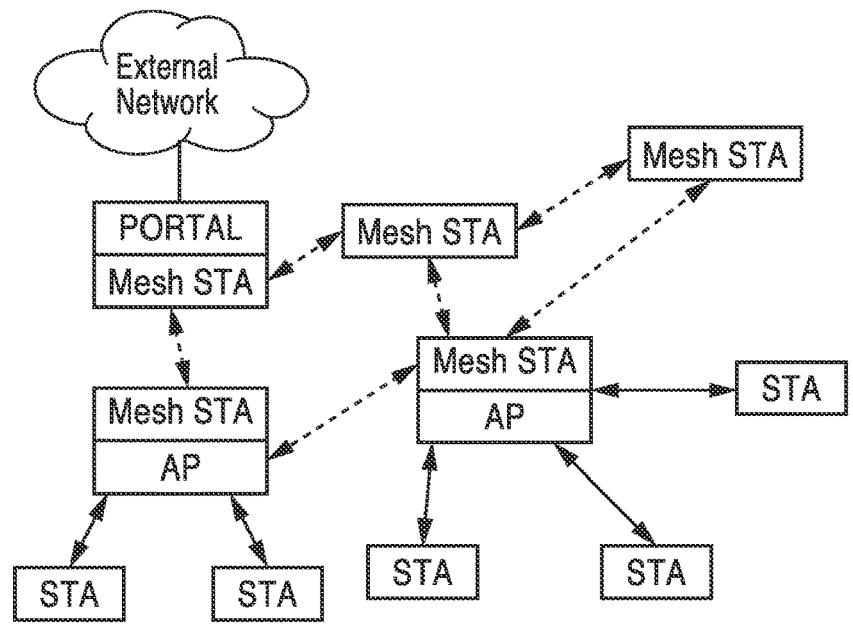
FIG. 2 is a node diagram for a mesh network showing a combination of mesh and non-mesh stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
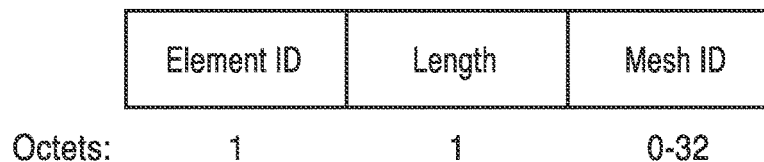
FIG. 3 is a data field diagram depicting a mesh identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example, it is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The standard 802.11a defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

1.4. IEEE 802.11ad Scanning and BF Training

An example of a mmWave WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmit Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing node (the responder) receives utilizing a quasi-Omni directional pattern. The responder determines the antenna array sector from the initiator which provided the best link quality (e.g. SNR).

Figure 5:
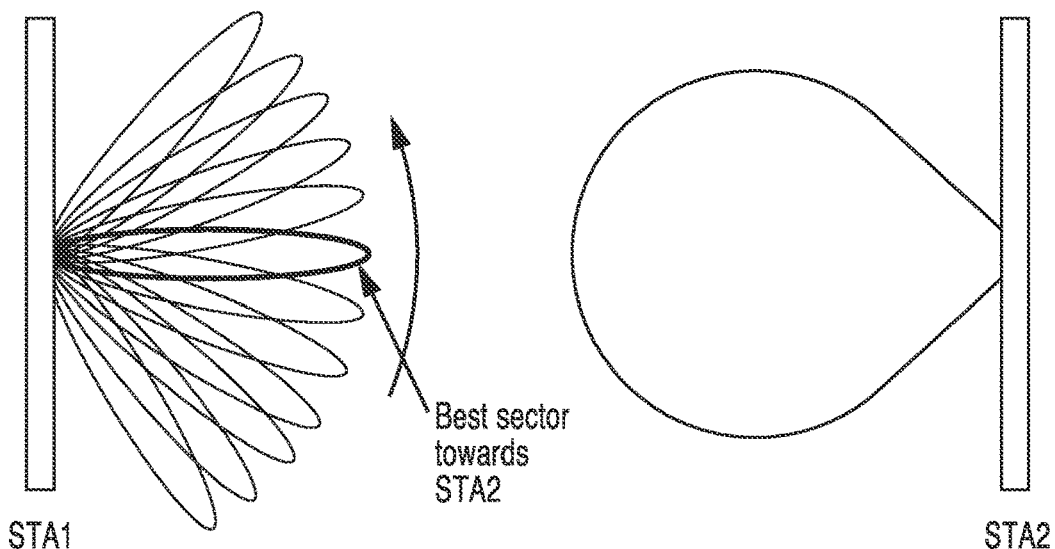
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 1 the best sector it received from STA 1.

Figure 6:
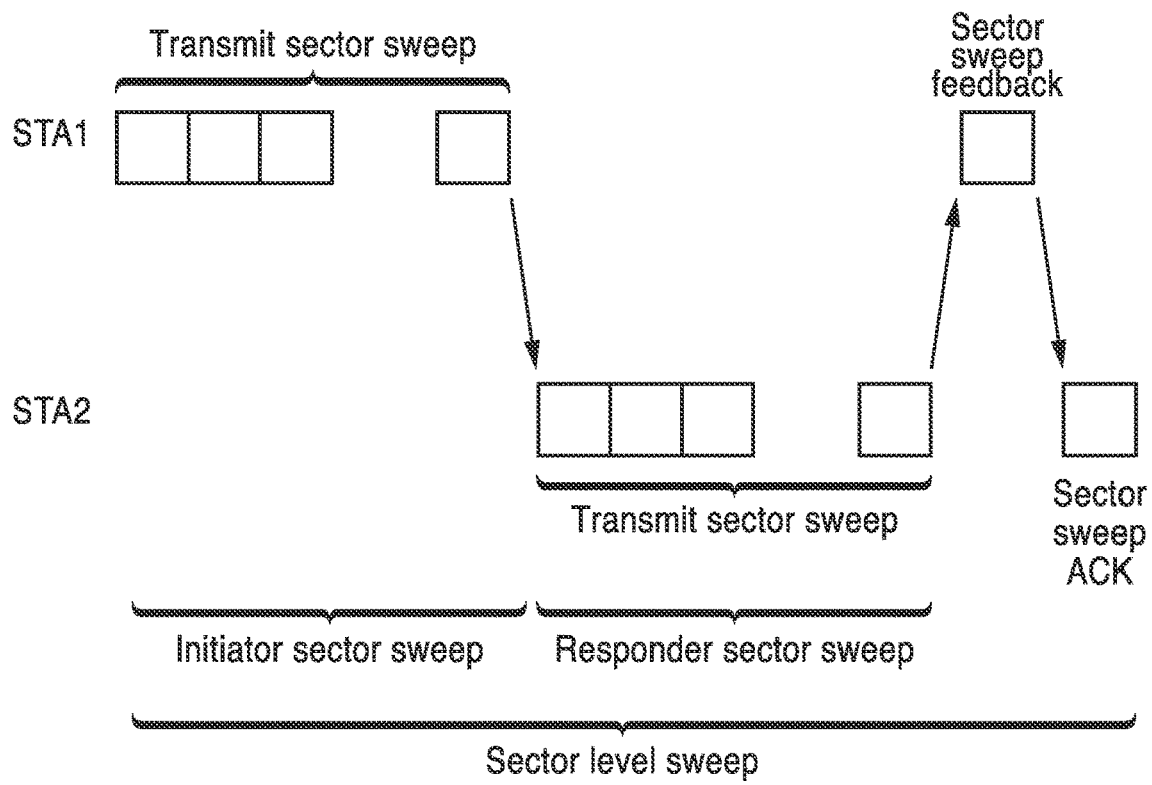
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of RX DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2. Problem Statement

Current millimeter wave (mmWave) communication systems, as described in the previous section, typically need to rely heavily on directional communication to gain sufficient link budget between transmitter and receiver. In current systems, this process of determining the proper beam for use requires significant signaling overhead. For example, the AP transmits multiple beacon frames with transmit beam forming.

The beacon frames are used for network discovery purposes, i.e., passive scanning. For this reason, beacon frames are transmitted periodically, so that a new STA can recognize the existence of the network by performing passive scanning in a certain time period. Network discovery can also be achieved using active scanning in which the new node transmits probe requests in all directions to make sure it is receivable by a nearby node in the network.

To further complicate the situation, current technology is trending toward the use of finer beam forming, which allows higher antenna gain to secure a higher link budget. However, the overhead problem is further exacerbated when the STA employs finer beams, because the STA is then transmitting a larger number of beacon frames to cover a sufficient transmission angle. Beacons are transmitted all the time in all directions, as well as periodically, to announce the network, maintain synchronization and manage the network resources.

In view of the above, an important trade-off exists between beaconing overhead and network discovery delay. If beacons are transmitted frequently, then the beaconing overhead increases, although this allows a new STA to find the existing network more quickly. If beacons are transmitted less frequently, the beaconing overhead can be decreased, however, it would be difficult for a new STA to find the existing network in a rapid manner.

When considering the task of forming a mesh network utilizing mmWave PHY technology, this overhead dilemma becomes even worse. A STA connecting to a mesh network needs to discover all neighboring STAs to decide on the best way to reach gateway/portal mesh STAs and the capabilities of each of these neighboring STAs. This means that all the STAs joining a mesh network should have the capability of beaconing which leads to significant signaling overhead.

Accordingly, the present disclosure is configured for addressing these current and future beacon overhead challenges.

3. Benefits of mmWave Multi-Band Network Discovery

In the disclosed network protocol, nodes participating in the multi-band network discovery are expected to have multi-band (MB) capabilities, comprising mmWave band capability, and also including a lower frequency communication band, such as sub-6 GHz. MB nodes are capable of using sub-6 GHz band for network announcement and discovery in addition to the mmW band. By utilizing the proposed technologies, mmWave communication nodes can form a mesh topology network without being subject to significant signaling overhead or network discovery delay.

The disclosure describes a mechanism for utilizing the already established sub-6 GHz network for aiding new nodes in finding other neighbors. A network node announces the mmW network on the sub-6 GHz band with a reduced power message sent periodically from a Quasi-omni antenna. Once the new STA discovers at least one neighbor through the sub-6 GHz band, this mesh station (MSTA) can assist the new node, and can also coordinate with other mesh nodes to assist the new STA in the mmW band to beamform and join the network.

In the present disclosure, station nodes are not sending beacons in all directions all the time in the mmW band. Nodes are triggered to send the discovery beacons in all directions upon a new node requesting assistance, whereas the overhead and interference associated with continuous beacon transmission in all directions is limited.

4. Multi-Band Network Discovery Embodiments 4.1. Topology Under Consideration

Figure 10:
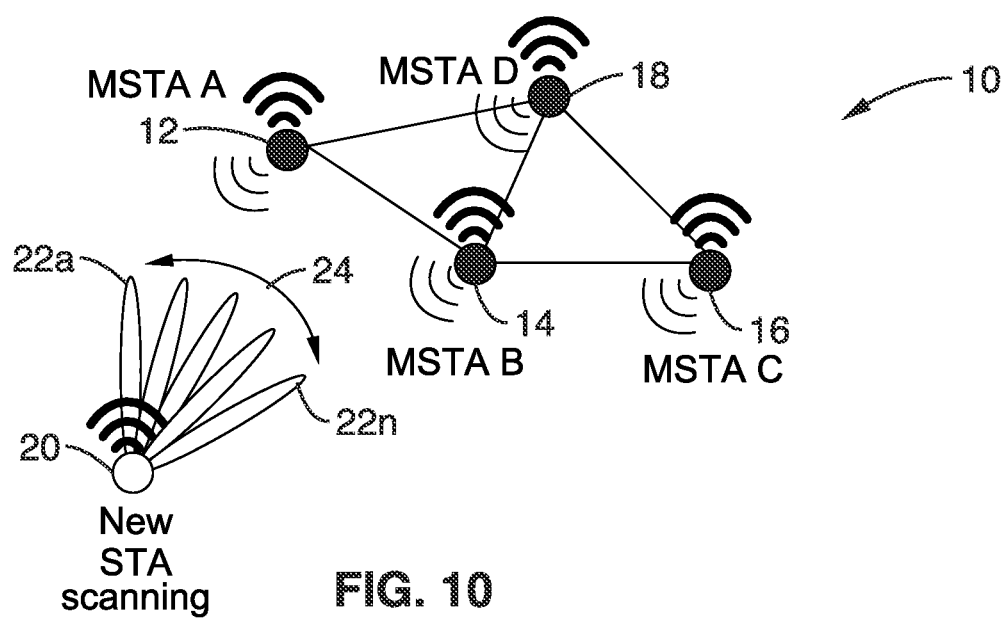
FIG. 10 is a wireless node topology example of wireless mmWave nodes in a wireless network as utilized according to an embodiment of the present disclosure.

FIG. 10 illustrates an example embodiment 10 of a network of mmW wireless nodes, in which mesh STA (MSTA) nodes 12, 14, 16 and 18 are connected in a mesh topology with each other. A new STA 20 is scanning 24, depicting directions 22a-22n, the communication medium for potential neighboring MSTA and pair nodes. In the example shown, nodes are capable of communicating on a sub-6 GHz band as well as mmWave and can use this band to send control signals between each other. Nodes that are connected to the mmW mesh network can access each other through the mmW links or through the sub-6 GHz band.

The new STA is scanning the medium for potential neighboring MSTA and pair nodes. For the mmW wave, directional transmission or reception is not required at all times at both sides. One side for example may be using directional transmission/reception while the other side does not. This case may be the result of limited device capabilities or application requirements where there is no need for directional transmission from both sides (limiting interference/small distance).

New nodes can use Omni/Quasi Omni directional or directional antennas for transmission and reception in the mmW band. MSTAs can use Omni/Quasi Omni directional or directional antennas for transmission and reception in the mmW band. For the mmW communications, at least one MSTA node or the new STA should use the directional antenna to provide sufficient gain to account for path loss and provide enough SNR for the link. The new STA scans for neighbors using either passive or active scanning. The new STA is configured to keep scanning until it finds all neighboring nodes. After the list of available neighbors is constructed by the new node, a decision about which neighbor to connect to is made. This decision preferably takes into account application demands, traffic loading in the network and wireless channel status.

4.2. STA Hardware Configuration

Figure 11:
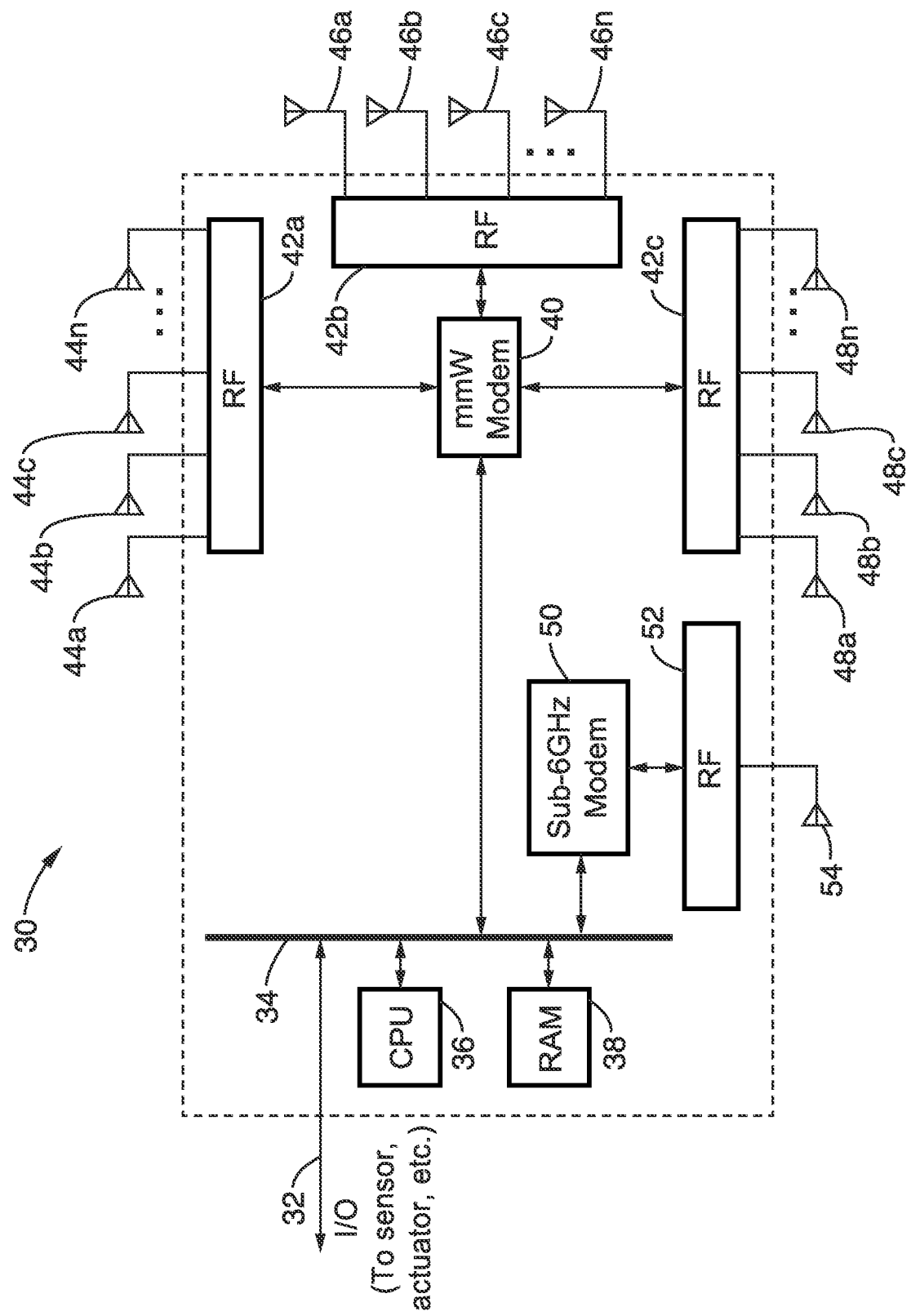
FIG. 11 is a block diagram of station hardware as utilized according to an embodiment of the present disclosure.

FIG. 11 depicts an example embodiment 30 of node hardware configuration. In this example a computer processor (CPU) 36 and memory (RAM) 38 are coupled to a bus 34, which is coupled to an I/O path 32 giving the node external I/O, such as to sensors, actuators and so forth. Instructions from memory are executed on processor 36 to execute a program which implements the communication protocols. This host machine is shown configured with a mmW modem 40 coupled to radio-frequency (RF) circuitry 42a, 42b, 42c to a plurality of antennas 44a-44n, 46a, 46n, 48a-48n to transmit and receive frames with neighboring nodes. In addition, the host machine is also seen with a sub-6 GHz modem 50 coupled to radio-frequency (RF) circuitry 52 to antenna(s) 54.

Thus, this host machine is shown configured with two modems (multi-band) and their associated RF circuitry for providing communication on two different bands. The mmW band modem and its associated RF circuitries are transmitting and receiving data in the mmW band. The Sub-6 GHz modem and its associated RF circuitry are transmitting and receiving data in the sub-6 GHz band.

Although three RF circuits are shown in this example for the mmW band, embodiments of the present disclosure can be configured with modem 40 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
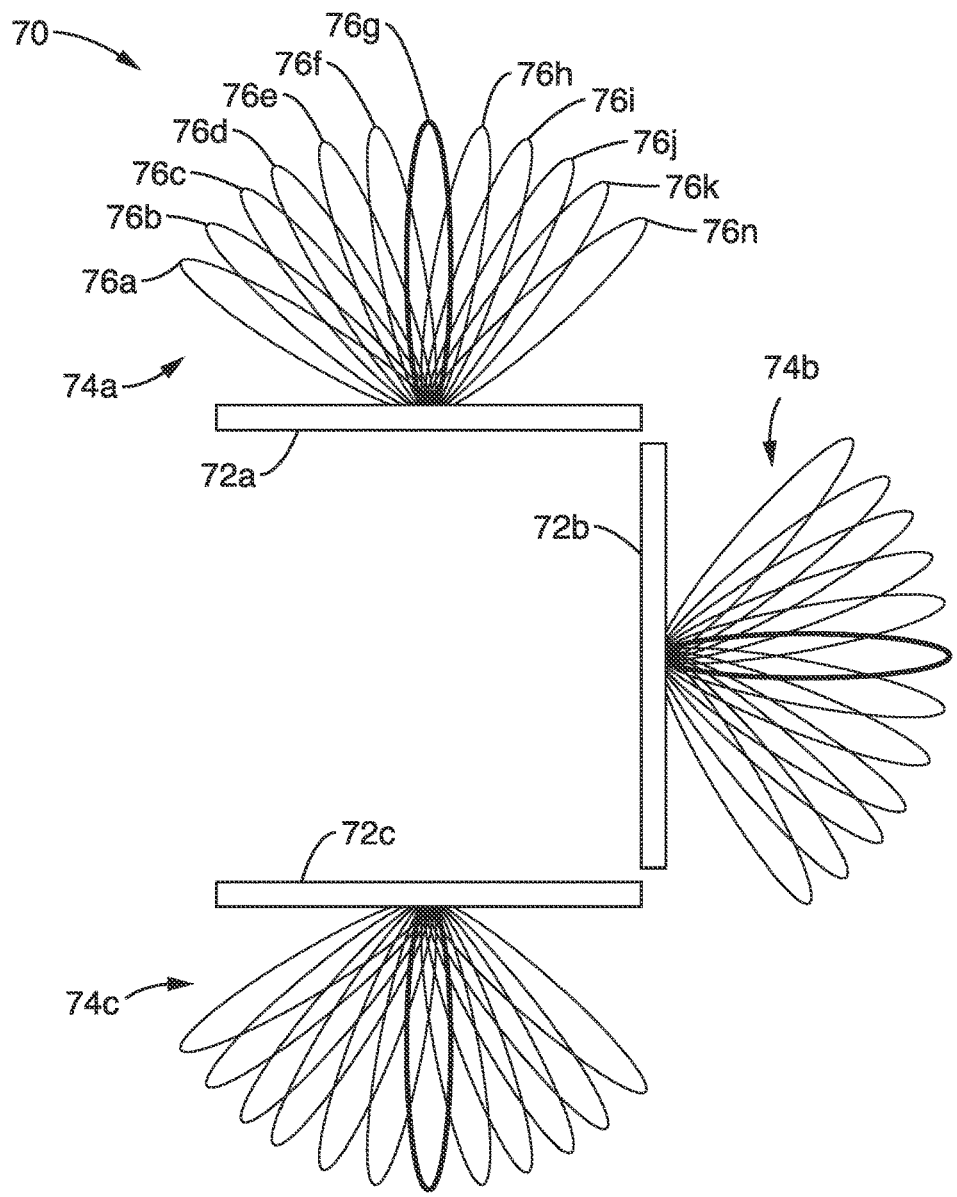
FIG. 12 is a mmW beam pattern diagram for the station hardware of FIG. 11 as utilized according to an embodiment of the present disclosure.

FIG. 12 illustrates an example embodiment 70 of mmWave antenna directions which can be utilized by a node to generate a plurality (e.g., 36) of mmWave antenna sector patterns. In this example, the node implements three RF circuits 72a, 72b, 72c and connected antennas, and each RF circuitry and connected antenna generate a beamforming pattern 74a, 74b, 74c. Antenna pattern 74a is shown having twelve beamforming patterns 76a, 76b, 76c, 76d, 76e, 76f, 76g, 76h, 76i, 76j, 76k and 76n ("n" representing that any number of patterns can be supported). The example station using this specific configuration has thirty six (36) antenna sectors. However, for the sake of clarity and ease of explanation, the following sections generally describe nodes having a smaller number of antenna sectors. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmWave RF circuity and beamforming commanded by the mmWave array antenna controller. Although it is possible that STA hardware components have different functional partitions from the one described above, such configurations can be deemed to be a variant of the explained configuration. Some of the mmWave RF circuitry and antennas may be disabled when the node determines it is unnecessary to communicate with neighbor nodes.

In at least one embodiment, the RF circuitry includes frequency converter, array antenna controller, and so forth, and is connected to multiple antennas which are controlled to perform beamforming for transmission and reception. In this way the node can transmit signals using multiple sets of beam patterns, each beam pattern direction being considered as an antenna sector.

Figure 13:
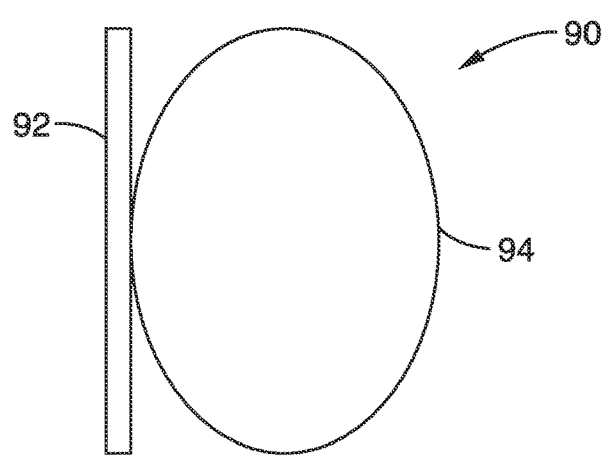
FIG. 13 is a beam pattern diagram for a secondary band communications antenna (i.e., sub-6 GHz), according to an embodiment of the present disclosure.

FIG. 13 illustrates an example embodiment 90 of antenna pattern for the sub-6 GHz modem assumed to use a Quasi-Omni antenna 94 attached to its RF circuitry 92.

4.3. Multi-Band Network Discovery Architecture

Wireless receivers and transmitters are expected to be shipped with multi-band chips that include for example, the use of the mmW band as well as a sub-6 GHz band. Operation in mmWave band can benefit from sub-6 GHz coverage in nodes discovery and neighbors scanning. The characteristics of signal propagation in the sub-6 GHz band can allow a node to more simply discover the existence of a mesh network, however localization of neighbors and finding the right sector or beam is still an issue.

To use multi-band network discovery, mesh nodes are assumed to be able to communicate with each other on the sub-6 GHz band. This is in the form of sending messages to all nodes of the network or sending a message to a specific node. This can be performed through direct communication between nodes or through multi-hop communication between nodes. New nodes are equipped with sub-6 GHz access as well, and can access the WLAN network or communicate with mesh nodes through sub-6 GHz communication. Discovery and network announcement can be performed utilizing the sub-6 GHz band, while forming the connectivity and maintaining the link is preferably carried out utilizing the mmW network. It should be appreciated that other control signaling can be moved to sub-6 GHz, as well, but that is not the focus of the present disclosure.

In mmW WLAN and mesh networks, beacons are utilized for: (a) network discovery and association for new mesh nodes; (b) synchronization; (c) spectrum access and resource management. For discovery and network announcement at mm wavelengths, the beacons have to be transmitted in all directions all the time in case of passive scanning. It will be appreciated that the meaning of "all the time" in the above statement only indicates a continued periodic nature of the beacons, while "all directions" only refers to using a sweep of directions to any desired angular resolution. In the case of active scanning, nodes transmit probe requests in all directions.

In the proposed system, nodes are using sub-6 GHz for discovery and network announcement, while synchronization, spectrum access and resource management information are still communicated through the mmW mesh network. Nodes that are already connected to each other in the mmW network still send beacons to each other only in the direction of the peer node or around this direction. Thus, beacons are not transmitted in all directions.

Announcement frames are sent through the sub 6-GHz band indicating the existence of a mmW network in the vicinity. The power output of this announcement frame is preferably adjusted (e.g., dynamically or statically) to only reach nodes within reach of the associated mmW signal, so as not to draw in nodes which are beyond the network in terms of mmWave communications.

The reception of the announcement frame by the new node or the mesh node can trigger a mmW discovery campaign by nodes in the vicinity of the new node to help finding the right sectors and neighbors for the new node to join the mmW network. The mmW discovery campaign involves other nodes around the new node sending beacons in sequential order to aid the new node in discovering the neighbors and their directionality information.

Figure 14:
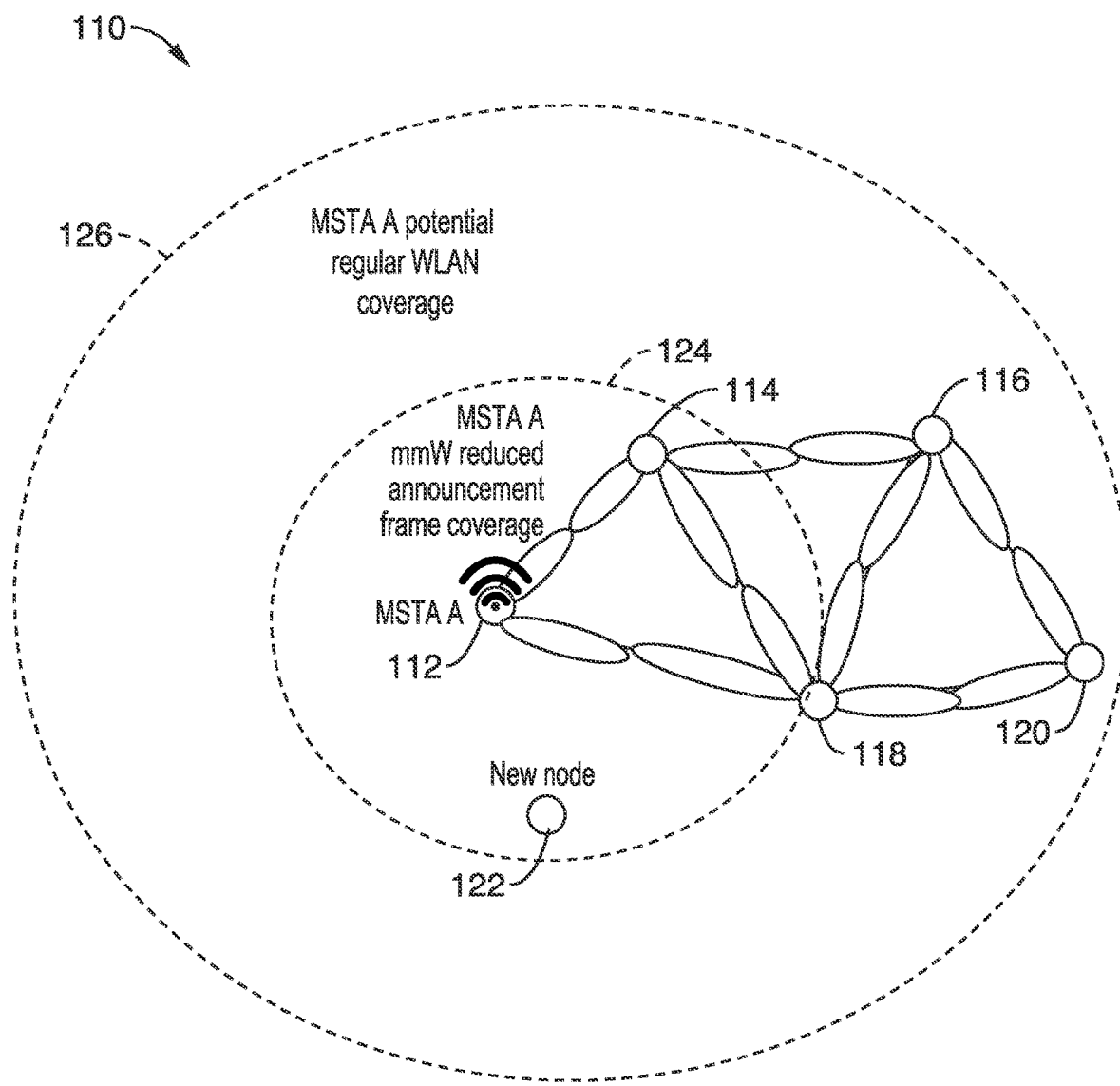
FIG. 14 is an antenna pattern map of a coverage area for sub-6 GHz announcement frames sent by a mesh node according to an embodiment of the present disclosure.
Figure 15:
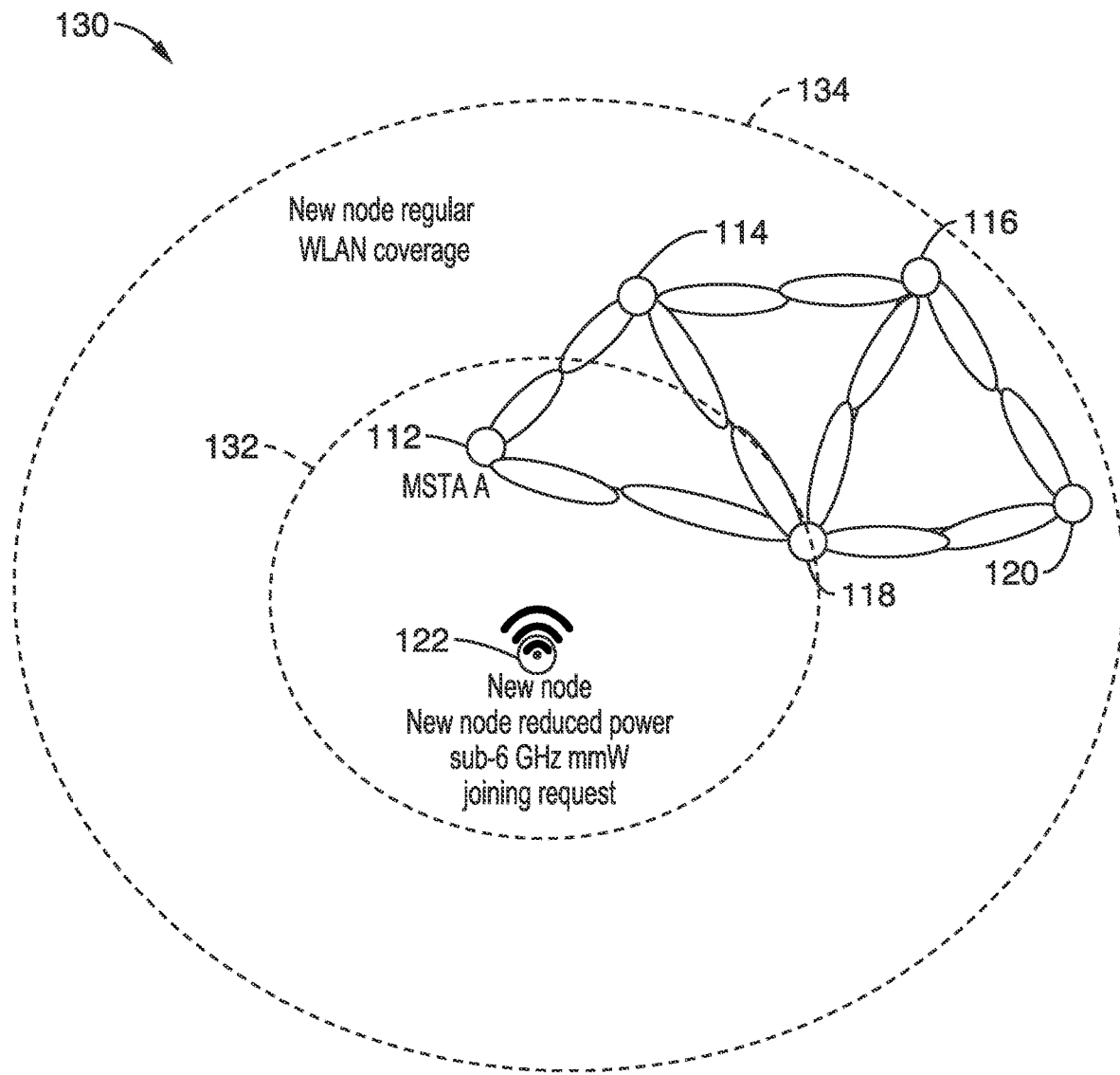
FIG. 15 is an antenna pattern map of a coverage area for sub-6 GHz announcement frames sent by a new node seeking to join the mesh network according to an embodiment of the present disclosure.

FIG. 14 and FIG. 15 illustrate an example embodiments 110, 130 of utilizing the sub-6 GHz band to send lower power announcement frames to other nodes to announce the network or announce a new node requesting assistance to join a network.

In FIG. 14 a mesh network 110 is seen with MSTA A 112, as well as nodes 114, 116, 118, 120 and a new node 122. In this example MSTA A is transmitting sub-6 GHz announcement frames to a reduced announcement frame area 124. It will be seen that if the transmit power of this sub-6 GHz announcement frame were sufficient 126 to cover the breadth of the mesh, including node 120 at the right of the figure, then nodes at other portions of the figure (e.g., left, up and down) would be led to believe they could join the network, but would actually be out of range of the mmW capability of the network.

In FIG. 15 a mesh network 130 is seen with MSTA A 112, as well as nodes 114, 116, 118, 120 and a new node 122. In this example the new node 122 is transmitting sub-6 GHz announcement frames as a joining request to a reduced announcement frame area 132. Similarly, it will be seen that if the transmit power of this sub-6 GHz announcement frame were sufficient 134 to cover the breadth of the mesh, including node 120 at the right of the figure, then nodes in the mesh outside of mmWave communication range of the new node, such as nodes 114, 116 and 120, could be triggered into responding to the new nodes join request, despite them being unable to directly communicate using mmWave with the new node.

4.4. Beaconing in the mmWave Network

Beaconing in the multi-band network is still occurring using mmWaves, but this is taking place only towards the peer nodes using communication or peer beacons. The communication or peer beacons are utilized for communication between peers with already established (setup) connections. This beacon can be utilized for carrying out functions related to maintaining synchronization, performing beam tracking and managing channel access and resources between mesh nodes in the network. Each mesh node sweeps beacons in sectors corresponding to directions of neighbor nodes only and transmits beacons to its neighbors only.

Figure 16A:
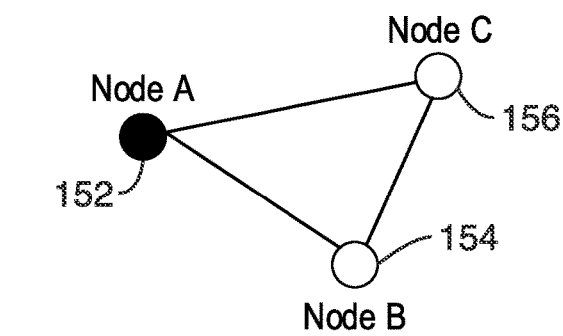
FIG. 16A through FIG. 16C is a wireless node topology and associated discovery beacon sweeping according to an embodiment of the present disclosure.
Figure 16B:
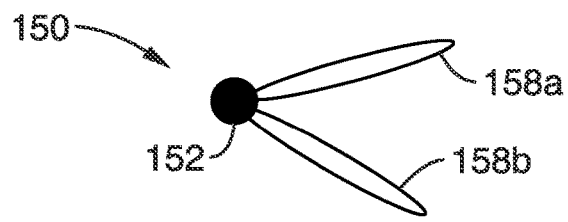
Figure 16C:
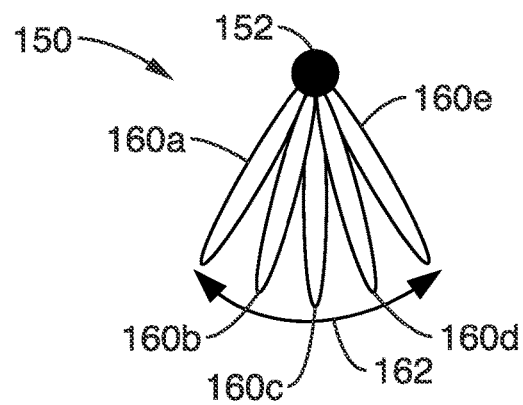

FIG. 16A through FIG. 16C illustrate aspects of a simple mmW network embodiment 150 considered by way of example and not limitation. In FIG. 16A example embodiment 150 is seen with three nodes 152, 154, and 156. In FIG. 16B beacons are shown transmitting from STA node 152, showing peer beacons being swept 156a, 156b in directions corresponding to best sectors towards nodes 154 and 156. In FIG. 16C STA node 152 sweeps 162 discovery beacons to cover a specific spatial area from 160a, 160b, 160c, 160d, and 160e. The present disclosure utilizes these beacons only in the directions from node A corresponding to nodes C and B as shown in FIG. 16B compared to what is traditionally used.

Figure 17A:
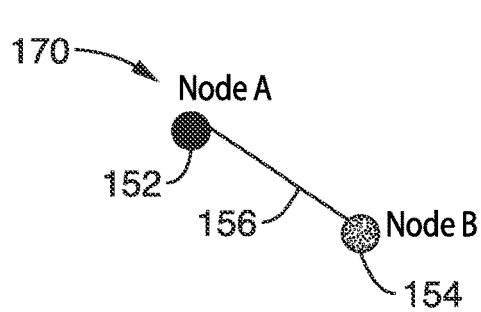
FIG. 17A and FIG. 17B is a wireless node topology upon which bracketing of best sector communications directions are performed according to an embodiment of the present disclosure.
Figure 17B:
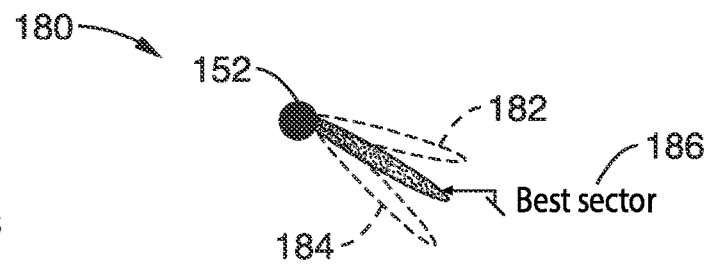

FIG. 17A and FIG. 17B illustrate an example embodiment 170 of providing additional robustness, by performing transmissions on one or more sectors around (bracketing) the determined best sector. In FIG. 17A node A 152 is seen in relation to node B 154 with the best sector (path) being direction 186 as seen in FIG. 17B. So although node A in communicating with node B has best sector 186, the presented protocol also selects one or more additional sectors 182, 184, on each side of this best sector to improve communications robustness, especially in view of the fact that node B may be moving in relation to node A.

It should be appreciated that the above peer beacons should be easily coordinated since the direction and the timing is known for each peer link. This results in limiting and managing interference due to the transmission of beacons in all directions.

Figure 18:
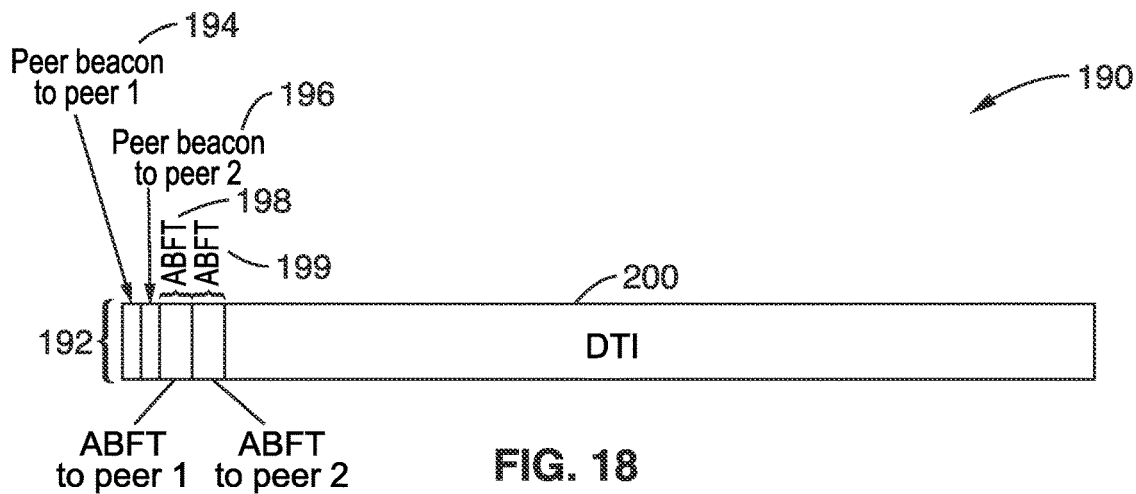
FIG. 18 is a communication period diagram showing a peer DMG beacon super frame format as utilized according to an embodiment of the present disclosure.

FIG. 18 illustrates an example embodiment 190 of a mmWave peer DMG beacon super frame format, for the present disclosure in which beacons are only transmitted in the direction of these two peer nodes, thus making the BTI process much shorter. In the figure the transmission includes peer beacons 192 shown exemplified for two peers as a beacon 194 to peer 1 and a beacon 196 to peer 2, followed by an association-beamforming training (ABFT) period 198 to peer 1, and an ABFT period 199 to peer 2, after which the data transfer interval (DTI) 200 commences. The ABFT period in this case can be pre-assigned to the peers associated with the transmitted beacons since no other nodes are expected to use this period of time.

4.5. Out of Band Discovery

Mesh nodes can transmit and receive on the sub-6 GHz band. Thus, a periodic announcement frame can be broadcast on the sub-6 GHz band about the existence and capability of the mmW network. A new node attempting to access the mmW mesh network can send an announcement request frame on the sub-6 GHz band to inform the nodes of its existence. The management of the mesh node announcement frame response, or the new node announcement request, can be distributed or centralized. A new node can utilize either passive or active scanning to search for nodes and discover neighbors in the network.

To limit interference and make sure that only nodes that can be accessed with a direct mmW link are accessed, the announcement frames are sent with lower power to reflect the mmW link budget. The required transmit power for the announcement frames can be determined such that frames are only received by a node if the link budget in the mmW band allows for a viable data link in the mmW network with that node.

If the announcement frames are transmitted with full power, a threshold is then utilized in at least one embodiment in the receiving node, to decide whether to respond to this frame, or to not response as it will be outside the mmW mesh node coverage area. The determination of this threshold can be performed such that frames are only considered if the link budget in the mmW band allows for a viable data link in the mmW network.

A new node can utilize passive scanning for mmW network on the sub-6 GHz band, or active scanning for mmW network on the sub-6 GHz band.

4.5.1. Passive Scanning

A new node listens to the sub-6 GHz band awaiting an announcement frame sent from one of the nodes. The transmission and reception preferably uses Quasi-Omni antennas. Once an announcement frame is found, the new node switches to the mmW band to connect with the discovered node. The discovered nodes start transmitting beacons in the mmW band to beamform with the new node. The node can use directionality information from the sub-6 GHz band, like the direction of the LOS or the strongest reflecting ray, to only send beacons through some of the beams in the mmW band.

If mesh assistance is enabled, the discovered nodes trigger other nodes in the surrounding area of the new node to start sending beacons to the new node and perform beamforming therewith. The transmission of the beacons can be coordinated between the mesh nodes to achieve quick connectivity and discovery of nodes.

Figure 19:
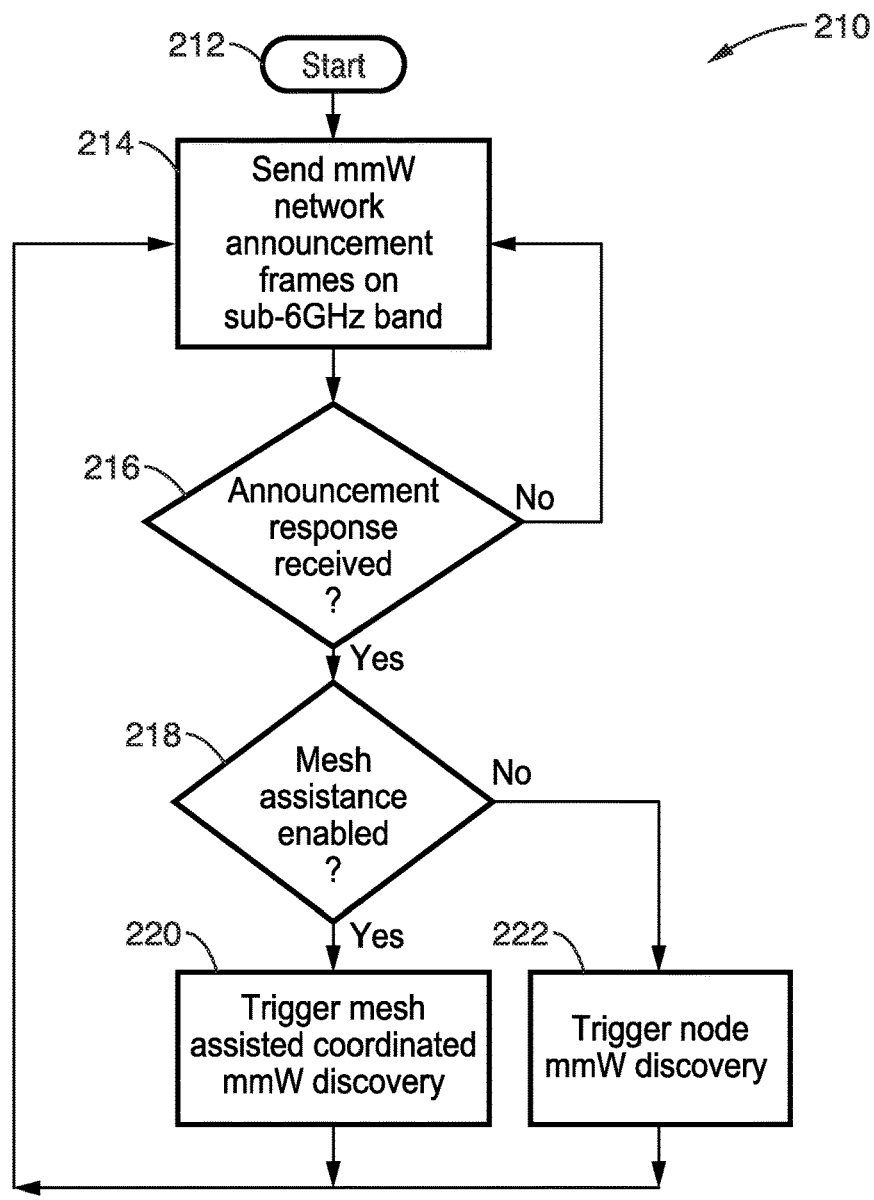
FIG. 19 is a flow diagram of sub-6 GHz assisted mesh node passive scanning according to an embodiment of the present disclosure.

FIG. 19 illustrates an example embodiment 210 of a process in which mesh nodes are handling new nodes according to passive scanning. The routine starts 212 and then sends 214 a mmW network announcement frames on the sub-6 GHz band. At block 216, if no announcement response is received, then execution returns to block 214 and sending of a subsequent announcement. Otherwise, if an announcement response is received, then a determination is made 218 if mesh assistance is enabled. If mesh assistance is not enabled, then block 222 is reached which triggers node mmW discovery, before returning back to block 214 and sending a network announcement. However, if mesh assistance is enabled, then block 220 is reached which triggers mesh assisted coordinated mmW discovery, before returning back to block 214 and sending a network announcement.

4.5.2. Active Scanning

In active scanning, the new node sends an announcement frame request at the sub-6 GHz band and waits for an announcement frame response sent from one of the nodes. In at least one preferred embodiment, the transmission and reception of these communications utilize Quasi-Omni antennas. Once an announcement frame response is received, the new node switches to the mmW band to connect with the discovered node. The discovered nodes starts transmitting beacons in the mmW band to beamform with the new node. The node can use directionality information from the sub-6 GHz band, like the direction of the LOS or the strongest reflecting ray, to only send beacons through some of the beams in the mmW band.

If mesh assistance is enabled, the discovered nodes trigger other nodes in the vicinity of the new node to start sending beacons to the new node and perform beamforming. The transmission of the beacons can be coordinated between the mesh nodes to achieve quick connectivity and node discovery.

Figure 20:
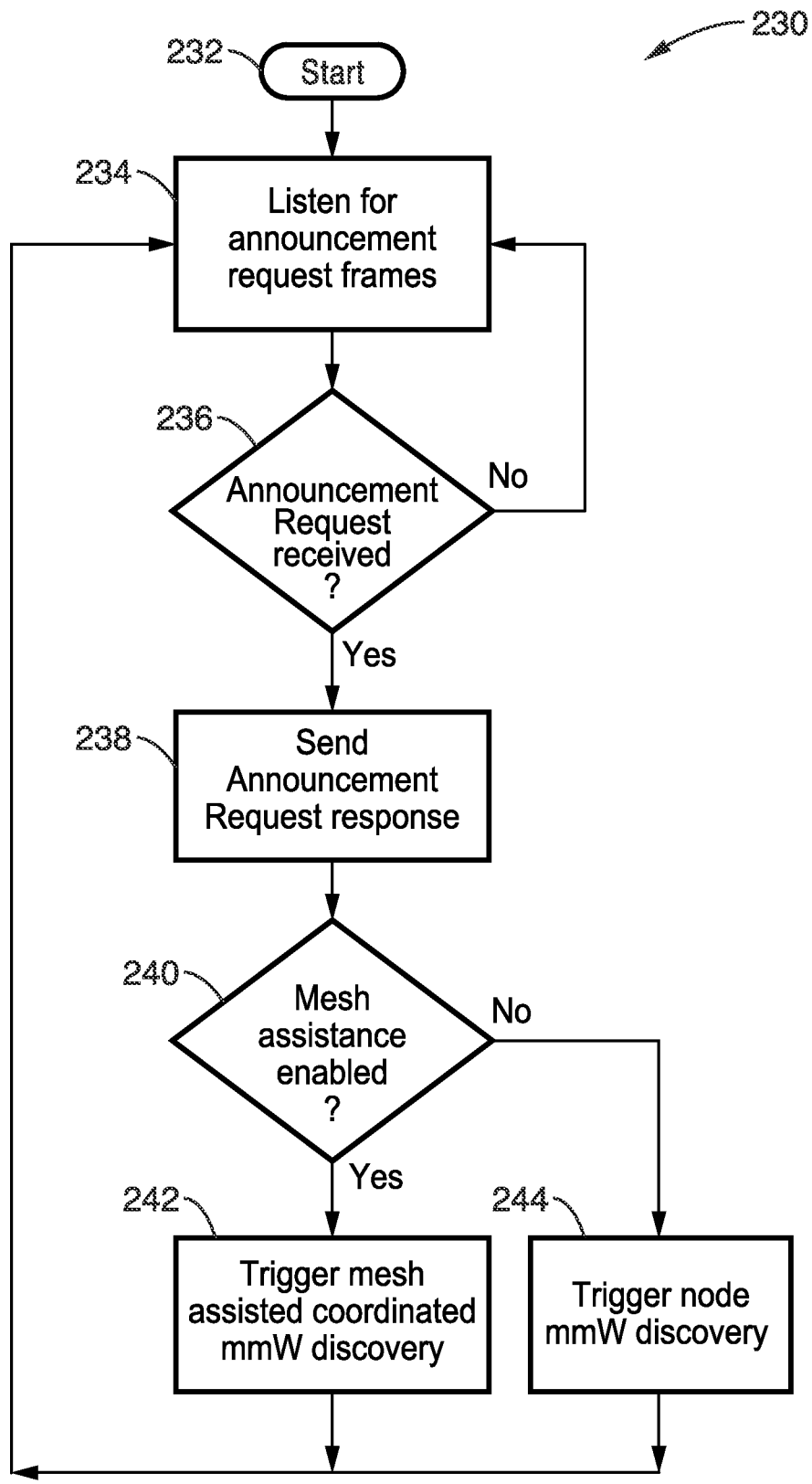
FIG. 20 is a flow diagram of sub-6 GHz assisted mesh node active scanning according to an embodiment of the present disclosure.

FIG. 20 illustrates an example embodiment 230 of a process in which mesh nodes are handling new nodes according to an active scanning. The routine starts 232 and then starts listening to announcement request frames 234. A check is made 236 if an announcement request has been received. If not, then the process continues to listen 234. Otherwise, a response to the announcement request is sent 238, and a check 240 made to determine if mesh assistance is enabled. If mesh assistance is not enabled, then mmW node discovery is activated 244, before returning to 232 to listen for announcement request frames. If mesh assistance is enabled, then mesh assisted coordinated mmW node discovery is activated 242, followed by returning to 232 to listen for announcement request frames.

4.6. Performing mmW Authentication on Sub-6 GHz

Once a new node discovers a neighboring node through the sub-6 GHz communication and decides to form a mmW link, it informs that neighbor through the announcement frame response or request.

The new node might trigger authentication requests before switching to the mmW band to guarantee that the potential mmW link is authenticated before commencing the mmW discovery campaign, so as to avoid unnecessary beamforming on the mmW band. The new node sends an authentication request and waits for authentication response, and in at least one embodiment, the new node acknowledges the authentication response. If the authentication response and acknowledgement both succeed then the new node and the neighboring nodes(s) start the mmW discovery campaign.

In case of mesh assistance being performed through geographical discovery zones of a node, the mesh node lists all potential neighbors to the new node in the authentication response if mesh assistance was enabled. The new node responds with a list of nodes of interest to potentially connect to. The mesh node considers only the list of nodes in the acknowledgement message for the discovery campaign.

4.7. Performing mmW Discovery and Beamforming

A new node discovers a neighbor or a mesh network through active or passive scanning in the sub-6 GHz band. The new node can act directly to check the mmW band and beamform with that neighbor. The new node will start scanning the mmW band for beacons. The new node can use Quasi-Omni antenna for scanning, or switch it's receive direction beams with a specific periodicity that depends on the mesh node capabilities. The new node is informed about the mesh node mmW antenna capability through the communications that are performed in the sub-6 GHz band. Some directionality information, such as the direction of the LOS or the strongest x beams, can be relayed to the new node through the sub-6 GHz band as well to limit the beams over which the new node is scanning. Some directionality information, such as the direction of the LOS or the strongest x beams, can be used by the mesh nodes to limit the directions over which it sends beacons to the new node.

The discovered mesh node is informed by the new node through the announcement response or the announcement request about the intention of the new node to join the network. If the new node mesh profile matches the network profile, the mesh node approves new node network joining in the acknowledgement message sent after the announcement response from the new node in case of passive scanning or through the announcement request response sent to the new node in case of active scanning.

The new node communicates its capability to the mesh node and provides localization information if it is available. The mesh node can use this information to optimize the directionality or power of the mmW beamforming. Mesh nodes can switch to discovery mode on the mmW band to allow nodes to beamform their antennas in the mmW band.

Figure 21:
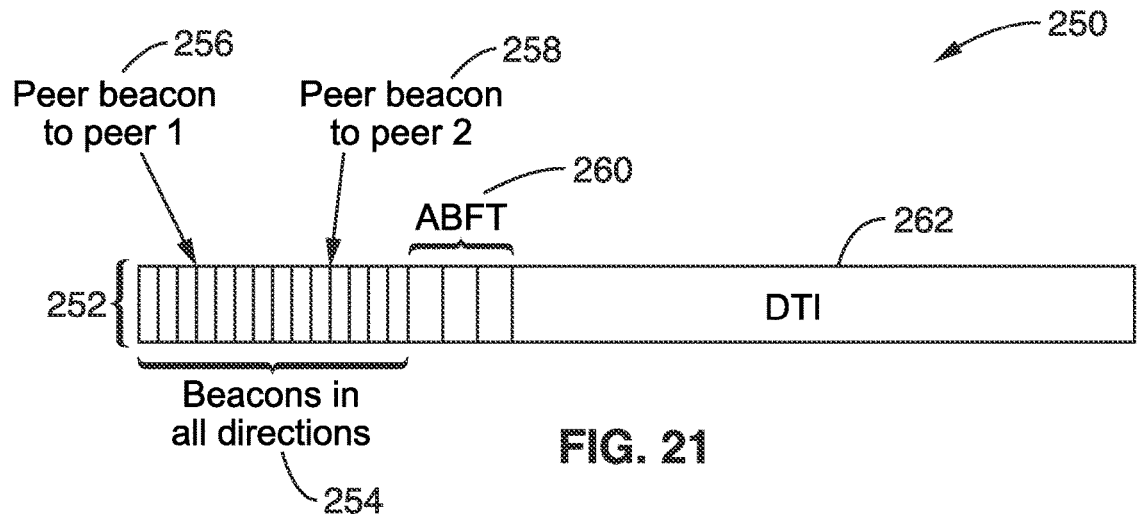
FIG. 21 is a communication period diagram showing a master beacon node super frame format as utilized according to an embodiment of the present disclosure.

FIG. 21 illustrates an example embodiment 250 of a master beacon node superframe format shown making beacon transmissions, which can be compared with the DMG peer beacons depicted in FIG. 18. The mesh node returns to transmitting only beacons to peer nodes after a few beacon intervals or after discovering the new node. In the figure, the transmission includes peer beacons 252 shown exemplified for two peers as a beacon 256 to peer 1 and a beacon 258 to peer 2, with beacons 254 sent in all directions, followed by an association-beamforming training (ABFT) period 260.

The ABFT slots are associated with the peer nodes and equal to the number of peer nodes. After the ABFT period, the data transfer interval (DTI) 262 commences.

Figure 22:
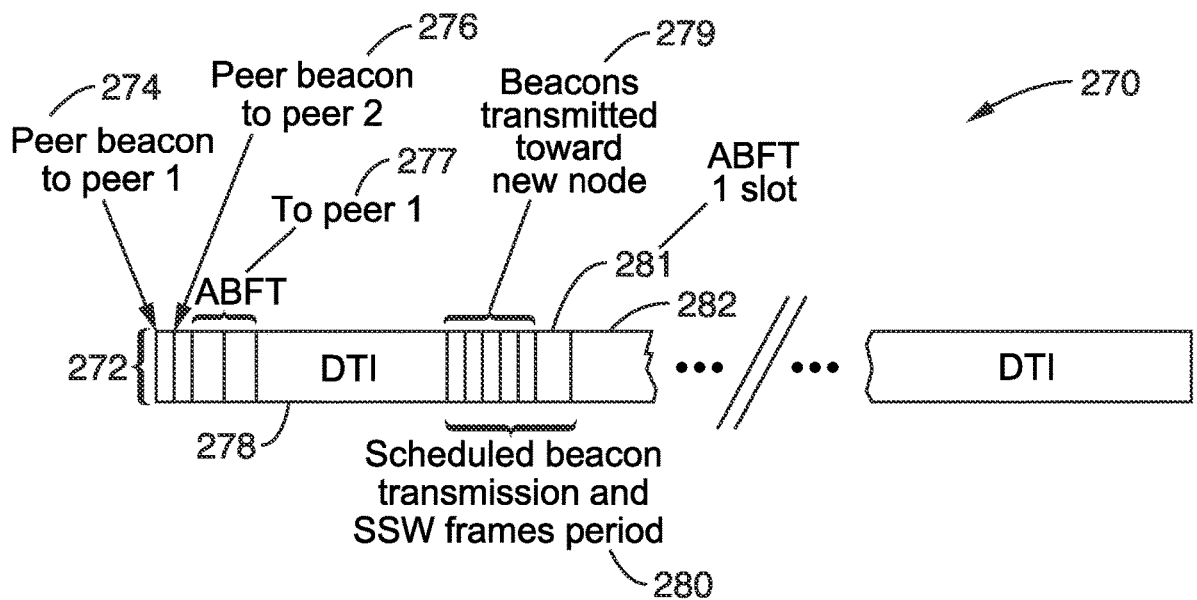
FIG. 22 is a communication period diagram showing discovery through scheduled beacon transmission and SSW frame exchange according to an embodiment of the present disclosure.

FIG. 22 illustrates an example embodiment 270 of discovery through scheduled beacon transmission and SSW frame exchange. In the figure it is seen that the mesh node can also schedule a beamforming session in the DTI period to beam form with the new node. Beacons 272 are seen transmitted 274 to peer 1 and transmitted 276 to peer 2, followed by an association-beamforming training (ABFT) period 277, followed by a data transfer interval (DTI) period 278. Then is a scheduled beacon transmission and SSW frames period 280, with beacons transmitted 279 toward the new node and ABFT 218 to first slot, these are then followed by another DTI 282. In the figure, the mesh node continues transmitting beacons to its peers only in the beacon transmission period and accidentally transmits beacons in all direction upon finding a new node through the sub-6 GHz scanning by scheduling that in the DTI period.

In the scheduled period, the SSW frame exchange can be dedicated to new node discovery only, hence no need to have many SSW slots like the ABFT period defined in the IEEE 802.11 standard. Once the new node is discovered and connected to the network, the mesh node starts transmitting regular peer beacons to the new node with each beacon transmission interval.

Figure 23A:
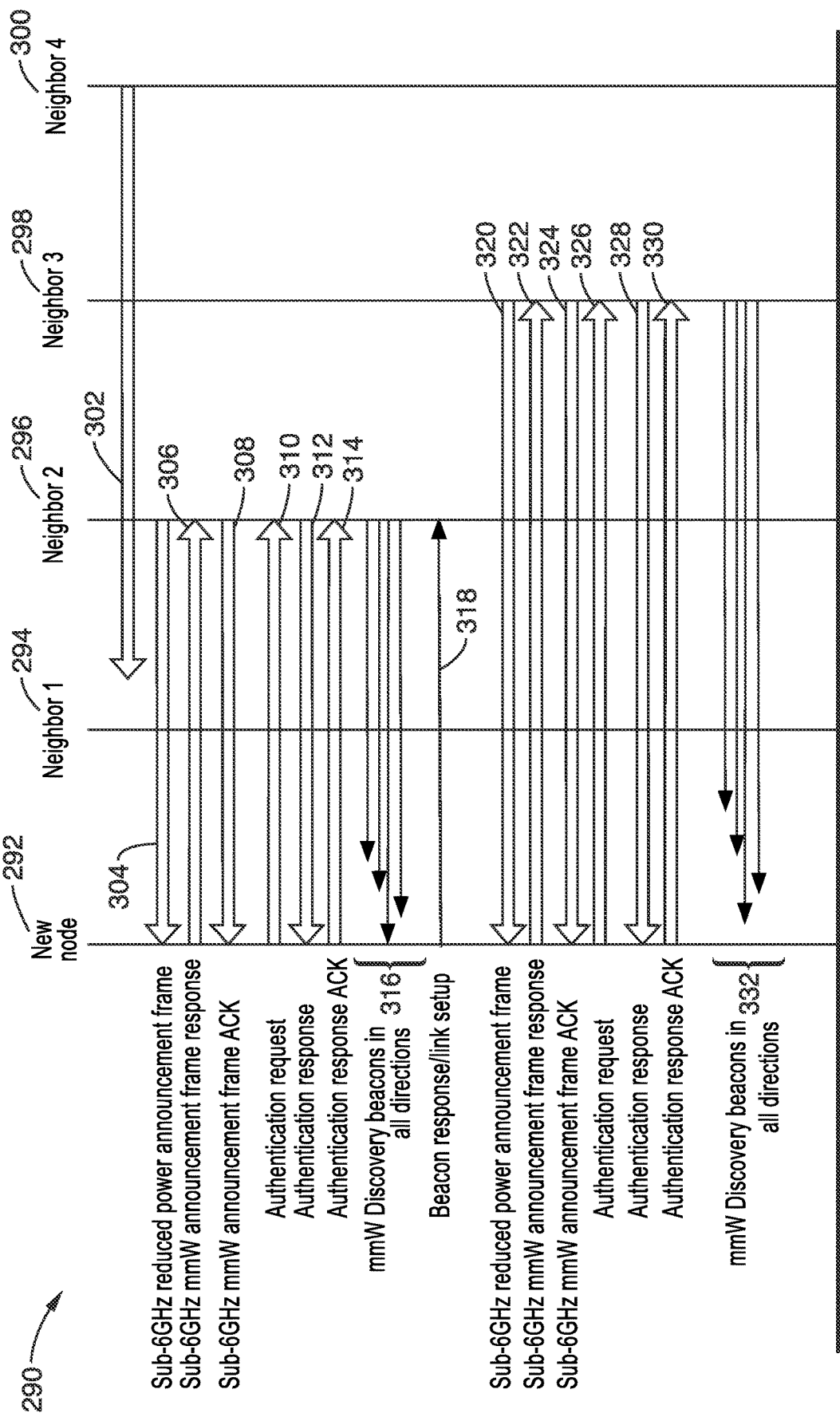
FIG. 23A and FIG. 23B is a message passing diagram for out of band node discovery according to an embodiment of the present disclosure.
Figure 23B:
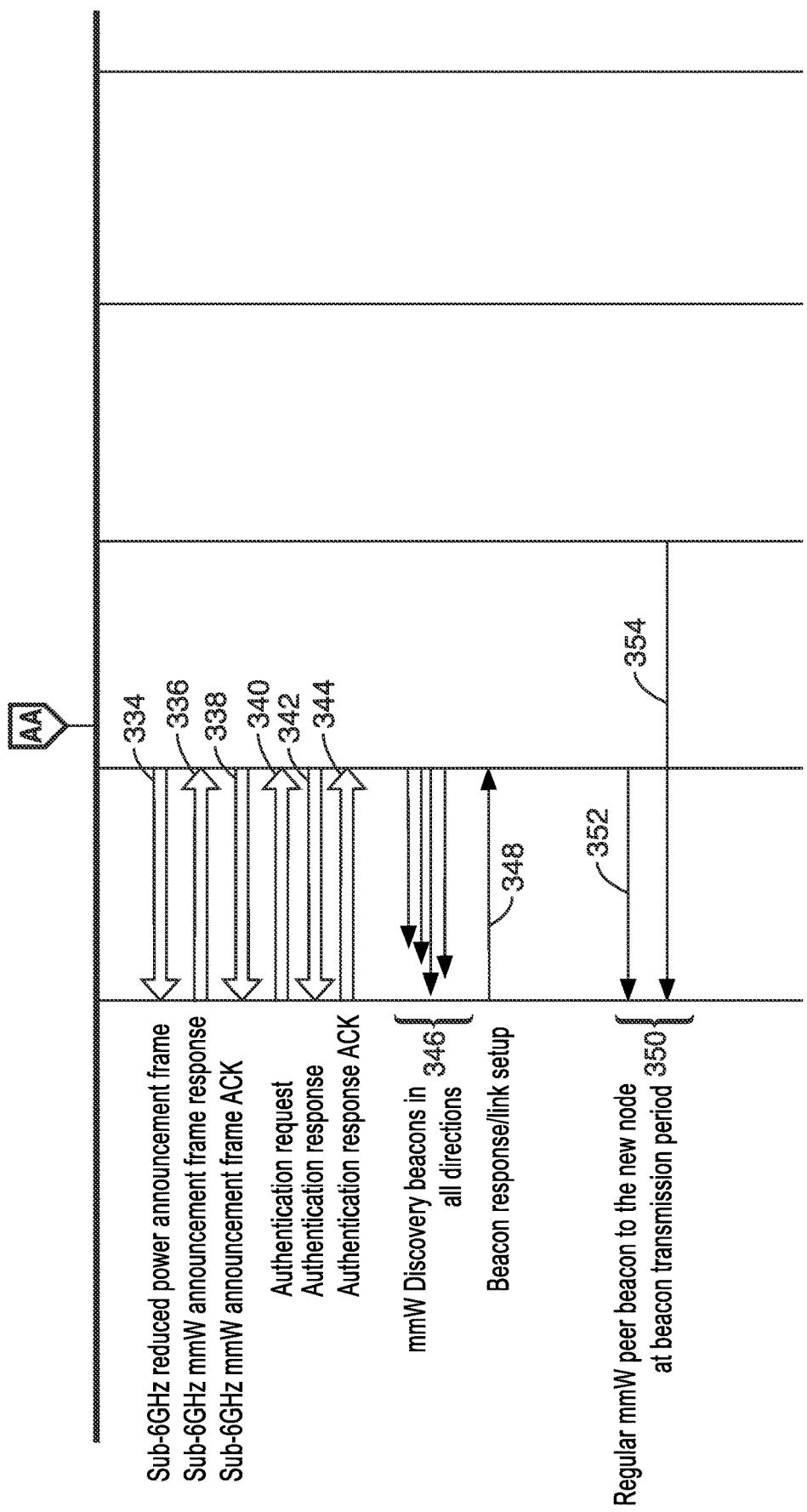

FIG. 23A and FIG. 23B illustrate an example embodiment 290 of signaling for out of band node discovery. In the figure the thick arrows represent signals sent over sub-6 GHz and thin arrows represent directional signals sent over the mmW band. The figure depicts communications between new node 292, node 294 neighbor 1, node 296 neighbor 2, node 298 neighbor 3, and node 300 neighbor 4. Announcement frames are transmitted over the sub-6 GHz band from 302 neighbor 4 300, and from 304 neighbor 2 296 to new node 292. The new node in this example received the announcement beacon from 296 neighbor 2 and responds to that by sending a mmW announcement frame response 306 over the sub-6 Ghz band. Neighbor node 296 responds to this by sending a mmw announcement frame acknowledgement (ACK) 308 over the sub-6 Ghz band. An authentication request 310, response 312 and acknowledgement 314 is exchanged over the sub-6 Ghz band to authenticate the node access to the mmW network. Once the new node is authenticated, neighbor 2 296 starts transmitting discovery beacons 316 as mmW transmissions in all or some directions depending on the information available from the sub-6 GHz communication. Once new node 292 receives one of these beacons, it responds with a beacon response or link setup acknowledgement 318.

The same process continues with other neighbors 298, 294 in the network. Node 298 neighbor 3 sends announcement frame 320 over the sub-6 GHz band, to which new node 292 responds 322, and then node 298 neighbor 3 ACKs 324. Authentication is shown with a request 326 from new node 292, a response 328, which is ACKed 330 by new node 292. In response to this, node 298 neighbor 3 starts transmitting discovery beacons 332 in all or some directions depending on the information available from the sub-6 GHz communication.

In FIG. 23B is seen a similar process between node 294 neighbor 1 sending announcement frame 334 over the sub-6 GHz band, to which new node responds 336 over the sub-6 GHz band, which node 294 neighbor 1 ACKs 344 also over the sub-6 GHz band. In response to this, node 294 neighbor 1 transmits discovery beacons 346 in all or some directions depending on the information available from the sub-6 GHz communication. In response to these discovery beacons, new node 292 sends a beacon response/link setup request 348.

It is then seen that regular directional mmW peer beacons 350 are received as beacon 352 from node 294 neighbor 1, and beacon 354 from node 298 neighbor 3.

It should be noted that the interchange between node 298 neighbor 3 and new node 292 differs from that of the other neighbors. It particular, in the example depicted, new node received the announcement frame on the sub-6 GHz 320 and successfully authenticated on the sub-6 GHz, but the beacons 332 were not received by new node 292. This is why the new node does not send a beacon response or link setup frame to neighbor 298. After the discovery process is complete, the new node received peer beacons 352, 354 from the neighbors it established connections to.

4.8. Mesh Assisted, or Coordinated, mmW Discovery

The new node discovery of a mesh node through sub-6 GHz scanning (active or passive scanning) can trigger mesh node coordinated mmW discovery campaign. By way of example and not limitation the mmW discovery campaign can be performed by contacted node members, or all nodes in the vicinity of the new node.

FIG. 24A and FIG. 24B illustrates an example embodiment 450 of mesh coordinated mmW node discovery, with a list of nodes discovered by the new node on the sub-6 GHz band. The new node listens on the sub-6 GHz band for sufficient time to discover all neighbors. The new node responds to each neighbor it has discovered. The nodes contacted by the new node coordinate with each other to form a discovery campaign.

In particular, the figure depicts interactions between new node 452, node 454 neighbor 1, node 456 neighbor 2, node 458 neighbor 3, and node 460 neighbor 4. A sub-6 GHz announcement frame 462 from node 460 neighbor 4 does not reach the new node 452. However, a sub-6 GHz announcement frame 464 from node 458 neighbor 3 is received by the new node, which sends 466 a sub-6 GHz response frame, which is acknowledged 468 by node 458 neighbor 3. In at least one embodiment of the disclosure, authentication takes place and is seen here with new node 452 sending an authentication request 470, to which node 458 neighbor 3 sends an authentication response 472, to which new node 452 sends an authentication response acknowledgement 474.

Node 454 neighbor 1 sends an announcement frame 476 which is received by new node 452 which sends response 478, that is acknowledged (ACK) 480 by node 454 neighbor 1. New node 452 sends an authentication request 482, to which node 454 neighbor 1 sends an authentication response 484, to which new node 452 sends an authentication response acknowledgement (ACK) 486.

Similarly, Node 456 as neighbor 2 sends an announcement frame 488 which is received by new node 452 which sends response 490, that is acknowledged 492 by node 456 as neighbor 2. New node 452 sends an authentication request 494, to which node 456 neighbor 3 sends an authentication response 496, to which new node 452 sends an authentication response acknowledgement (ACK) 498. Mesh node coordination is performed to form a discovery campaign. The coordination is illustrated with an abstraction showing communications 500, 502 and 504 in the figure for the sake of simplicity. The coordination can be performed through sharing information about the new node and deciding on a sequence, or order, over which nodes are reaching out to the new node. Coordination should take interference and scheduling of resources into account. Once the discovery campaign is completed, then the new node can use mmW communications with the neighbors in the mesh. Node 454 as neighbor 1 is seen sending mmW discovery beacons 506 in all directions, some of which are received at the new node 452 which sends a beacon response/link setup 508. Similarly, node 456 as neighbor 2 is seen sending mmW discovery beacons 510 in all directions, some of which are received at the new node 452 which sends a beacon response/link setup 512. Also in this manner, node 458 as neighbor 3 is seen sending mmW discovery beacons 514 in all directions, some of which are received at the new node 452. Regular mmW peer beacons 516, with a transmission 518 from node 454 neighbor 1, and 520 from node 456 neighbor 2 are seen being sent to new node 454 neighbor 1 in response to the new node sending response/link setup requests to these neighbors.

Figure 25:
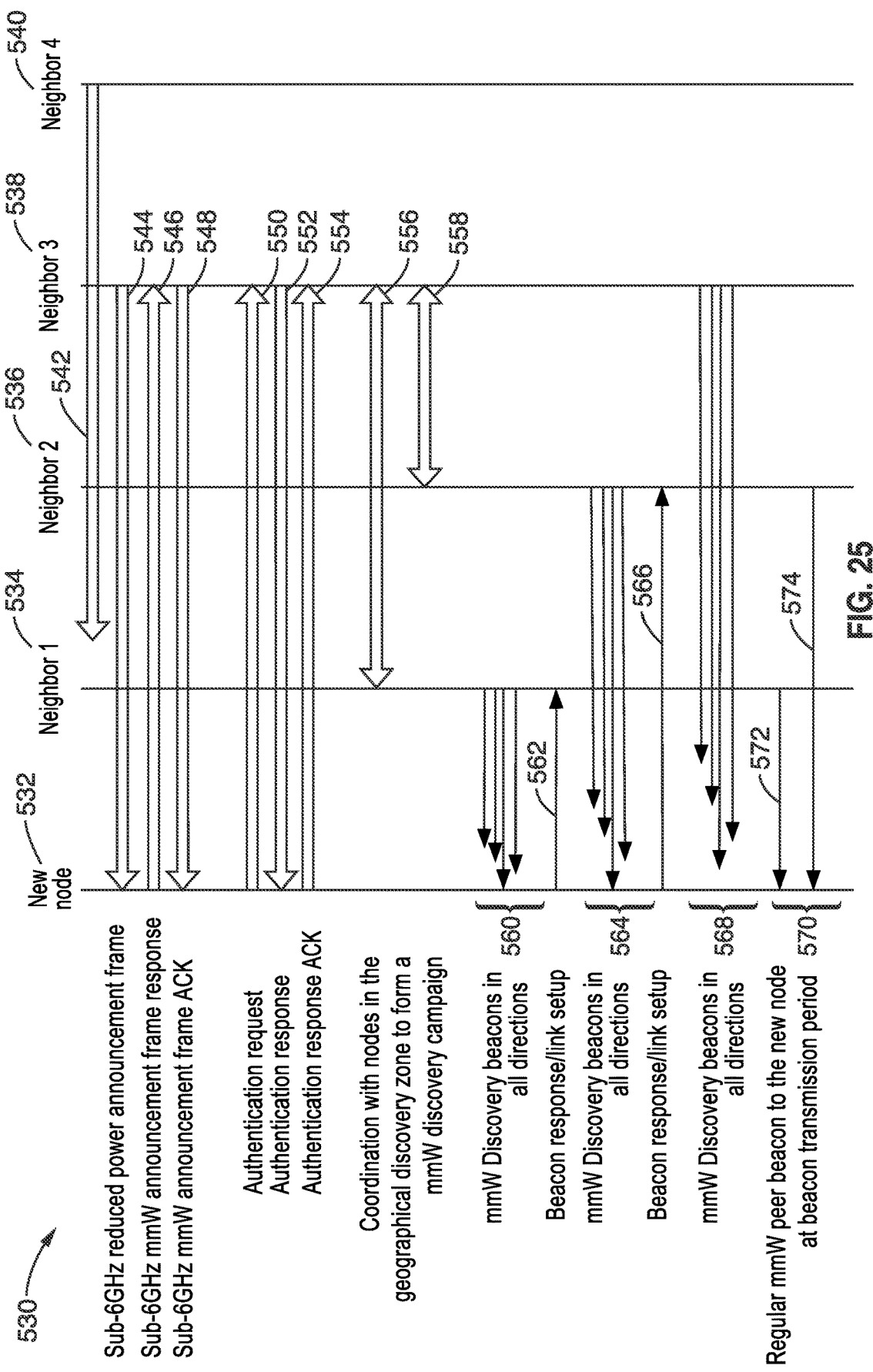
FIG. 25 is a message passing diagram for out of band mesh assisted discovery through coordination with nodes in the geographic discovery zone according to an embodiment of the present disclosure.

FIG. 25 illustrates an example embodiment 530 of an out of band mesh assisted discovery. The mesh node that is contacted coordinates with all nodes in the new node geographical discovery zone to start a discover campaign for the new node. The mesh nodes contacted comprise all potential neighbors of the new node based on an estimate that depends on the discovered STA(s) (nodes in its geographical discovery zone). The new node listens to the sub-6 GHz band until it discovers at least one neighbor. The new node responds to this neighbor on the sub-6 GHz band informing it about the interest to peer with it on the mmW band. The geographical discovery zone is defined as nodes that are potential neighbors to the new node given that it can discover one or more neighbors in the sub-6 GHz band. Based on the data collected from the sub-6 GHz scanning, the mesh coordinates a discovery campaign for the new node. The discovery campaign can be scheduled in multiple forms.

In the figure is depicted interactions between new node 532, node 534 neighbor 1, node 536 neighbor 2, node 538 neighbor 3, and node 540 neighbor 4. A sub-6 GHz announcement frame 542 is sent from node 540 neighbor 4 but does not reach new node 532. However, a sub-6 GHz announcement frame 544 from node 538 neighbor 3 is received by the new node, which sends 546 a sub-6 GHz response frame, which is acknowledged 548 by node 538 neighbor 3. In at least one embodiment of the disclosure, authentication takes place and is seen here with new node 532 sending an authentication request 550, to which node 538 neighbor 3 sends an authentication response 552, to which new node 532 sends an authentication response acknowledgement 554.

Mesh node coordination 556, 558 is performed to form a discovery campaign. This coordination can be through reaching out to all potential neighbors of the new node and coordinating the sequence or the time over which each node will start transmitting its discovery beacons. Coordination should take interference and scheduling of resources into account. Once the discovery campaign is completed, then the new node can use mmW with the neighbors in the mesh. Node 532 as neighbor 1 is seen sending mmW discovery beacons 560 in all directions, some of which are received at the new node 532 which sends a beacon response/link setup 562. Similarly, node 536 as neighbor 2 is seen sending mmW discovery beacons 564 in all directions, some of which are received at new node 532, with the new node sending a beacon response/link setup 566. Also in this manner, node 538 as neighbor 3 is seen sending mmW discovery beacons 568 in all directions, some of which are received at the new node 532. Regular mmW peer beacons 570, are shown comprising transmission 572 from node 532 neighbor 1, and transmission 574 from node 536 neighbor 2, seen being sent to new node.

Figure 26A:
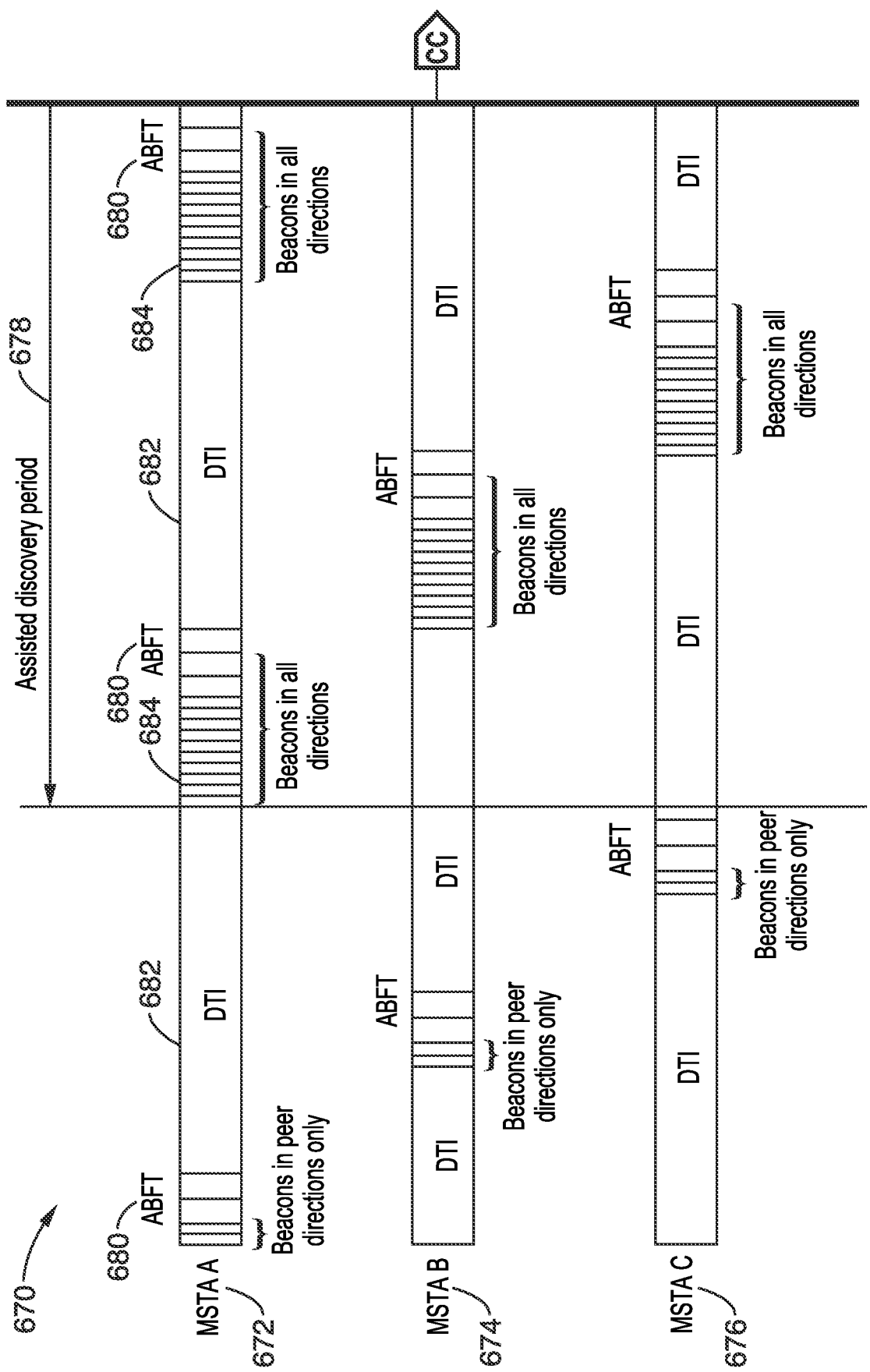
FIG. 26A and FIG. 26B is a communication period diagram depicting discovery assistance utilizing mmW discovery beacons according to an embodiment of the present disclosure.
Figure 26B:
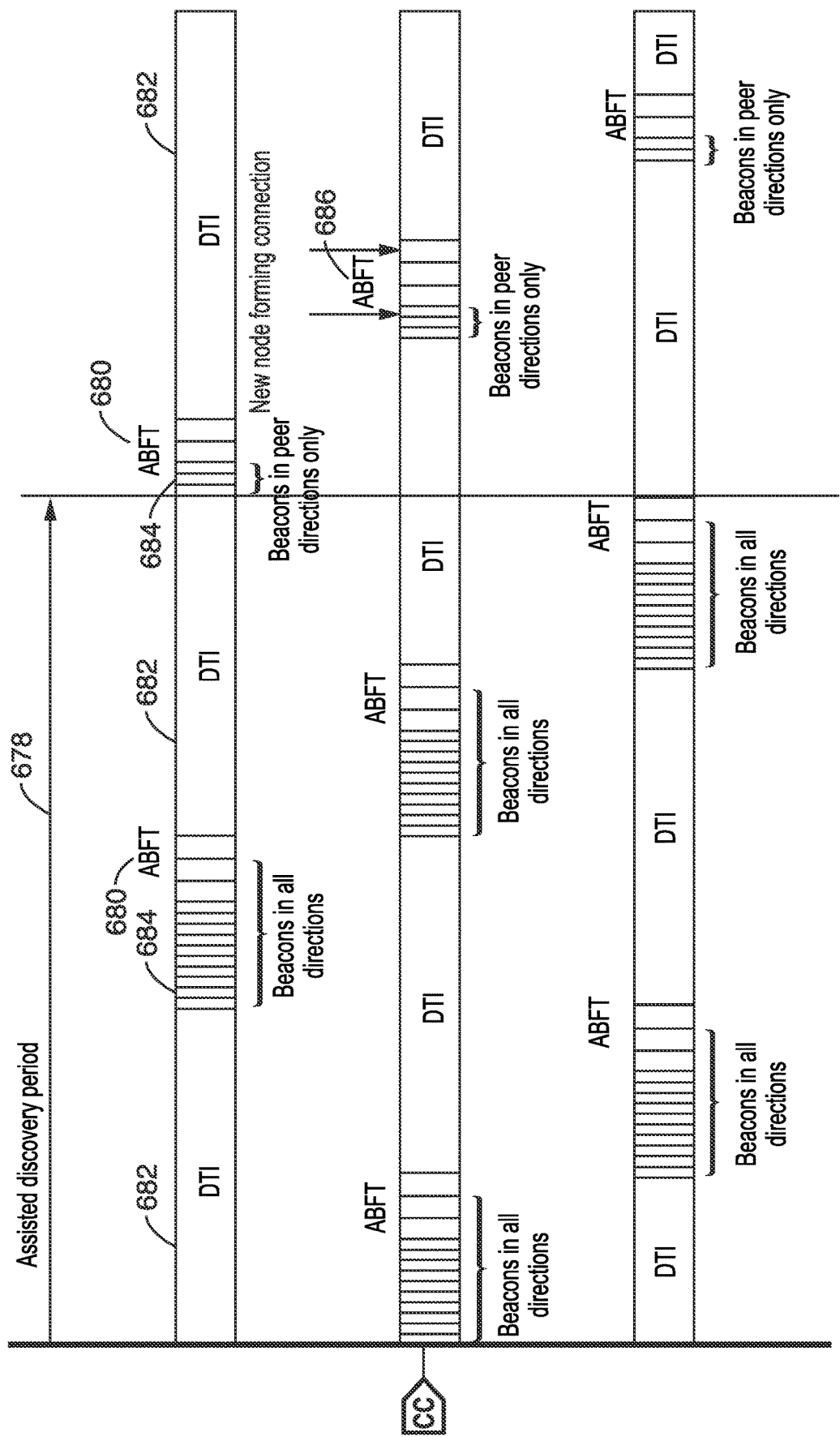

FIG. 26A and FIG. 26B illustrates an example embodiment 670 of discovery assistance through mmW discovery beacons. Nodes in the geographical discovery zone switch to discovery mode on the mmW band to allow nodes to beamform their antennas in the mmW band. The figure depicts transmissions for MSTA A 672, MSTA B 674, and MSTA C 676. In MSTA A for example are seen ABFT period 680, then DTI period 682, and it can be seen that beacons are sent 684 in all directions with additional ABFT 680 and DTI 682 periods. The transmission diagram is marked showing the assisted discovery period 678, which leads to the new node forming 686 a connection.

Thus, the figure shows switching to transmitting beacons through all antennas in the beacon transmission period. Mesh nodes will return back to transmitting only beacons to peer nodes after a few beacon intervals or after discovering the new node. Before the mesh nodes start transmitting beacons, the ABFT period for the mesh node comprises slots for each of the peer beacons transmitted. This makes the number of slots for SSW frames exchange equal to the number of peers. When the mesh node switches to sending discovery beacons, it adds a new slot for the new node. At the end of the discovery phase the mesh node can end up with a connection with the new node and permanently allocates a slot for it in the ABFT as seen with MSTA B.

Figure 27A:
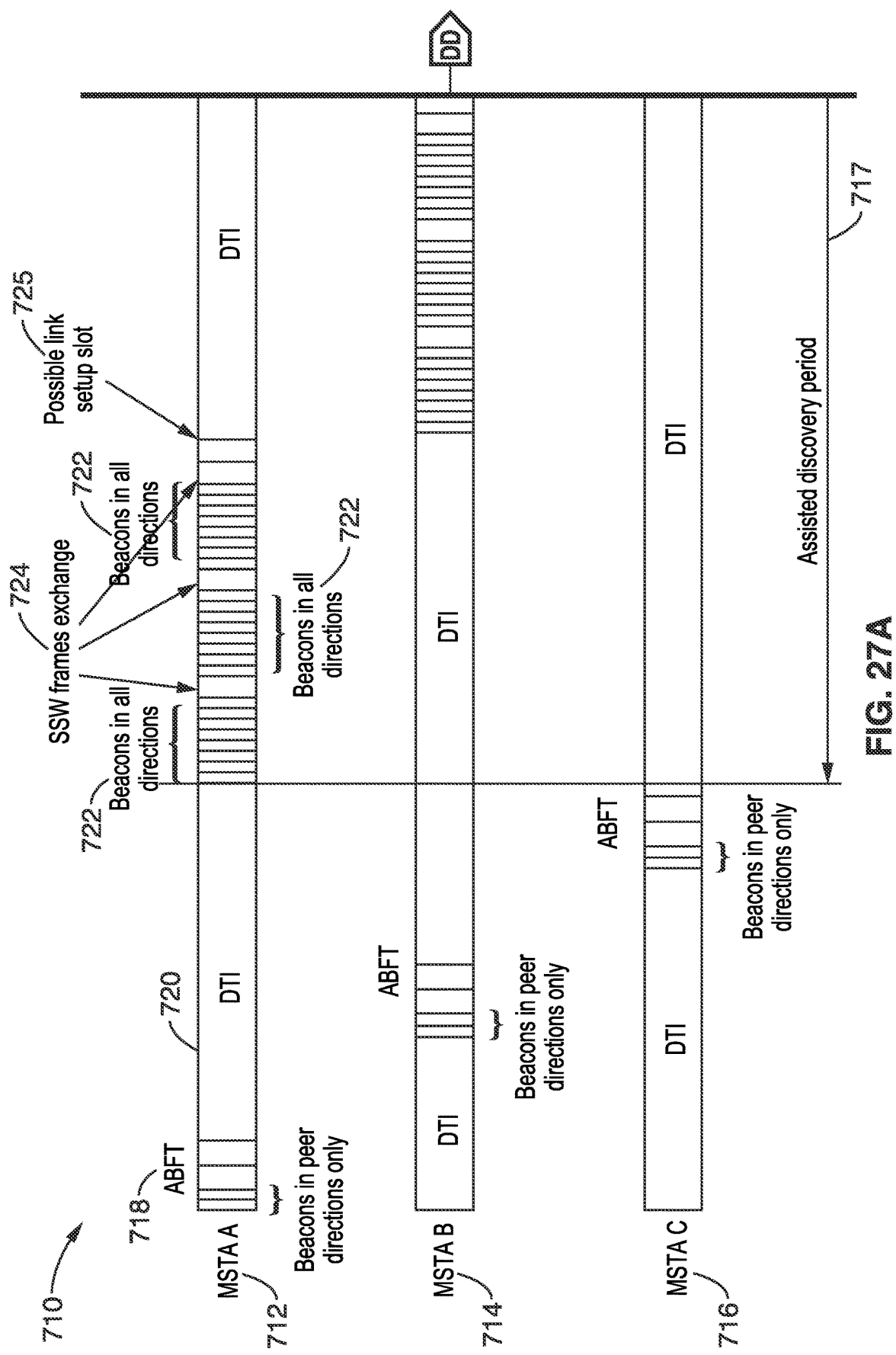
FIG. 27A and FIG. 27B is a communication period diagram depicting assisted discovery at DTI according to an embodiment of the present disclosure.
Figure 27B:
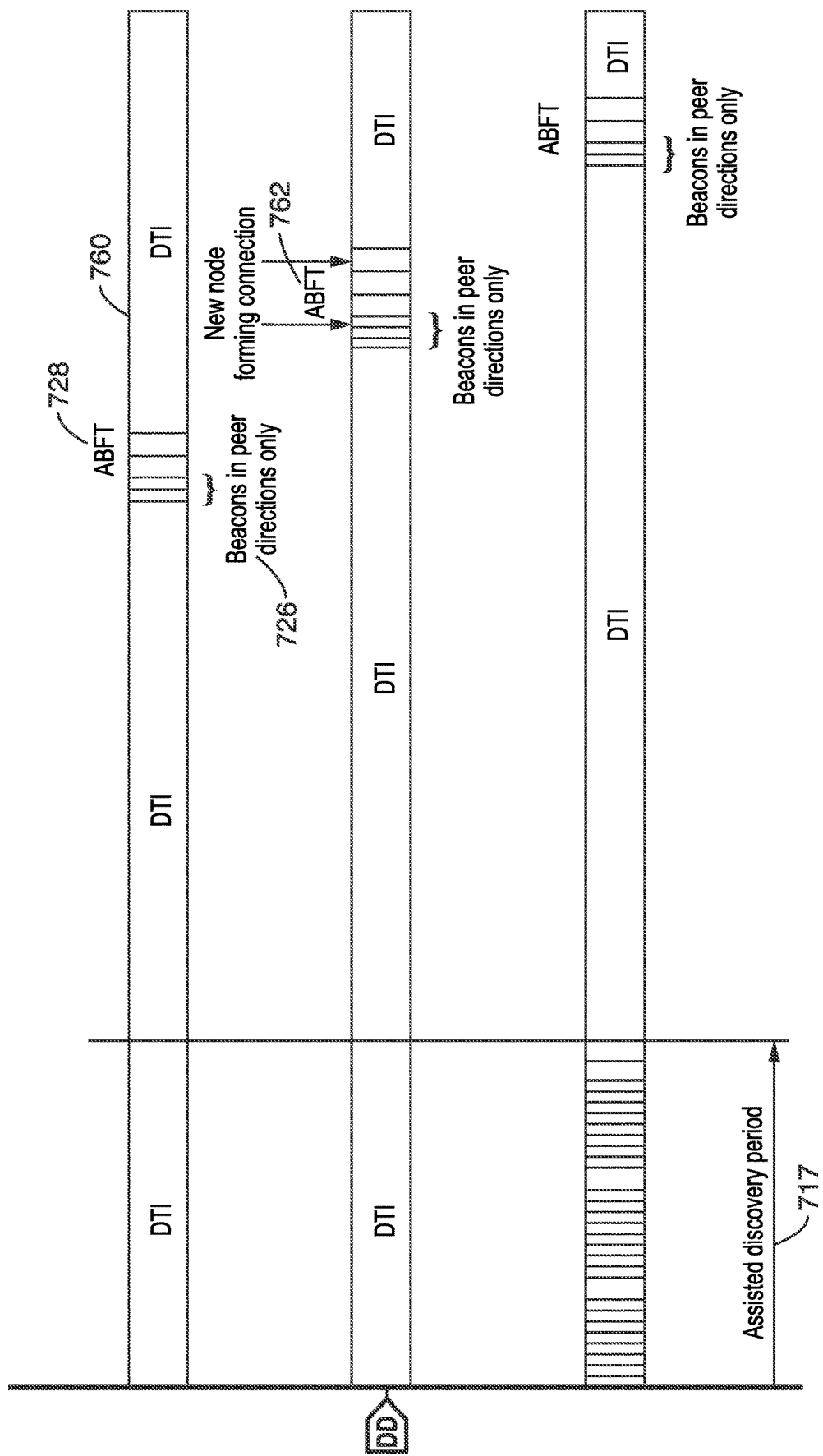

FIG. 27A and FIG. 27B illustrates an example embodiment 710 of nodes in the geographical discovery zone coordinating the transmission of discovery beacons on the mmW band to allow nodes to beamform their antennas in the mmW band. In the figure transmissions are scheduled through all antenna sectors in the DTI period. The mesh node repeats the transmission of the beacons for many cycles depending of the capabilities of the new node as discovered by the sub-6 GHz.

The figure depicts transmissions for MSTA A 712, MSTA B 714, and MSTA C 716. In MSTA A for example are seen ABFT period 718, then DTI period 720, with assisted discovery period 717 being entered followed by SSW frame exchange 724 with periods of beacons sent in all directions 722, after which is a possible link setup slot 725. Transmissions by MSTA A 712 are seen continuing with beacons 726 sent in peer directions only, ABFT period 728 and DTI period 730. The figure also shows in MSTA B with the new node forming 732 a connection in response to assisted discovery period 717.

Thus, as seen in the figure, at the end of each beacon transmission cycle, transmitting beacons from all antenna sectors, a slot is assigned for SSW frame exchanges. In at least one embodiment, a period of time is also reserved for peer link establishment at the end of the transmission of all beacon cycles and SSW slots. At the time of beacon transmission in the regular frame, if the new node is connected to the mesh node a peer beacon and an assigned SSW slot is added and dedicated to the new node as seen with MSTA B.

4.9. Geographical Discovery Zone

A geographical cluster of nodes are created for each MSTA or MSTA sector. For each node sector, the area where this sector is covering represents the foot print of this sector. A set of possible neighboring nodes or node sectors that can be discovered in the foot print of this sector comprise the geographical discovery node/sector set. This set contains nodes or sectors that might be seen by any new node discovered by or in this sector. Not all the members of this set would typically be discovered by the new node but it represents all possible potential neighbors. This set should be updated any time a new node is joining the network to include new MSTAs joining. This set can be constructed either using measurement campaign collection, topology information of the network or some form of antenna pattern analysis.

Figure 28:
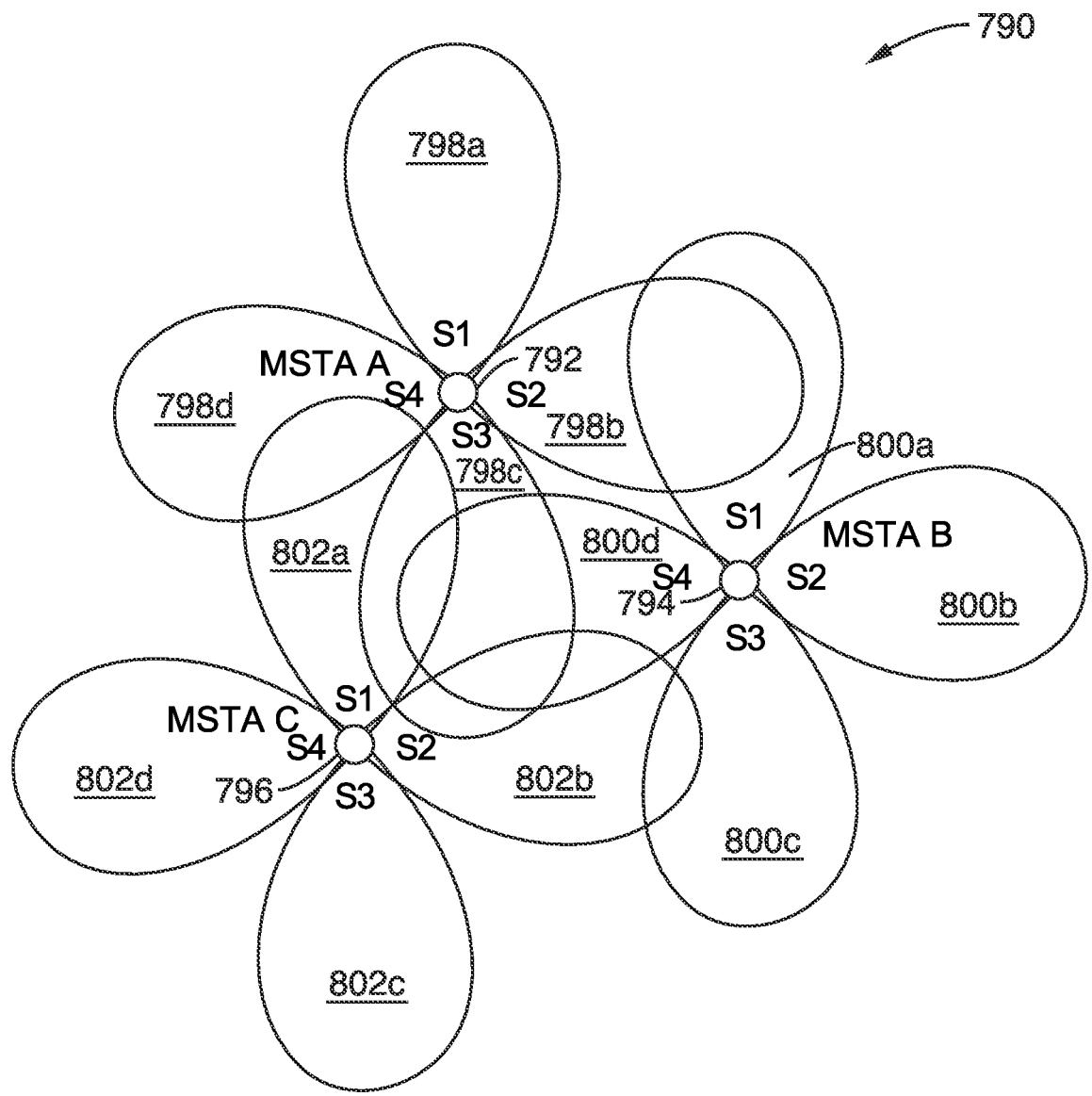
FIG. 28 is a node sector coverage diagram showing geographical sector coverage between nodes utilized according to an embodiment of the present disclosure.

FIG. 28 illustrates an example embodiment 790 of a node or sector geographical discovery set (sector coverage area). The figure depicts node MSTA A 792 with sectors 798a through 798d, MSTA B 794 with sectors 800a through 800d, and MSTA C 796 with sectors 802a through 802d, depicting their overlapping antenna direction sectors. It can be seen from the figure that any node discovered by MSTA A 792, Sector 3 (S3) 798c can have MSTA C 796 (S1) 802a and (S2) 802b, and/or MSTA B 794 (S4) 800d as neighbors as well. Any node discovered by MSTA B 794 (S1) 800a, will only have MSTA A 792 (S2) 798b as a potential neighbor. The formation of the geographical discovery zones can be performed by the system through measurement reporting in the network or by utilizing an analytical cell planning process.

The analytical cell planning is based on estimating at each coverage area of a node's sector what the potential neighbors are and load the list at the node sector. To generate this list through measurement reporting, a centralized or distributed procedure can be utilized. Each node and/or sector maintains a list of neighboring nodes/sectors that can be discovered by this node/sector. In at least one embodiment, these lists are processed collectively to form relationships between them. The outcome is to estimate for each sector what the potential neighbors are if that sector is discovered.

The more nodes in the network the more accurate the estimate of the discovery zones will be. Also as nodes are moving and discovering new nodes, an update should be sent with a new set of nodes/sectors that can be discovered. The mobile node are discovering and losing sight with other nodes and forming new lists of neighbors that can be seen simultaneously. These lists are saved and periodically processed.

In the centralized procedure, nodes are sending the neighboring list for each sector to a central entity. The central entity collects all lists from all network nodes and forms the geographical discovery zone. The central entity sends geographical discovery zone set to each node after processing the collected lists. The nodes can send a report of all lists collected over a period of time periodically or momentarily once the neighboring list changes to update the network information.

In the distributed procedure, nodes are sending each of these lists to all members of these lists. In this case the list should be sent the moment the list is updated to all members of the list before the node loses sight of any of the list members. Once a node receives a list from another node, it adds all the members of the list to the discovery zone of the sector that it was received from.

Figure 29:
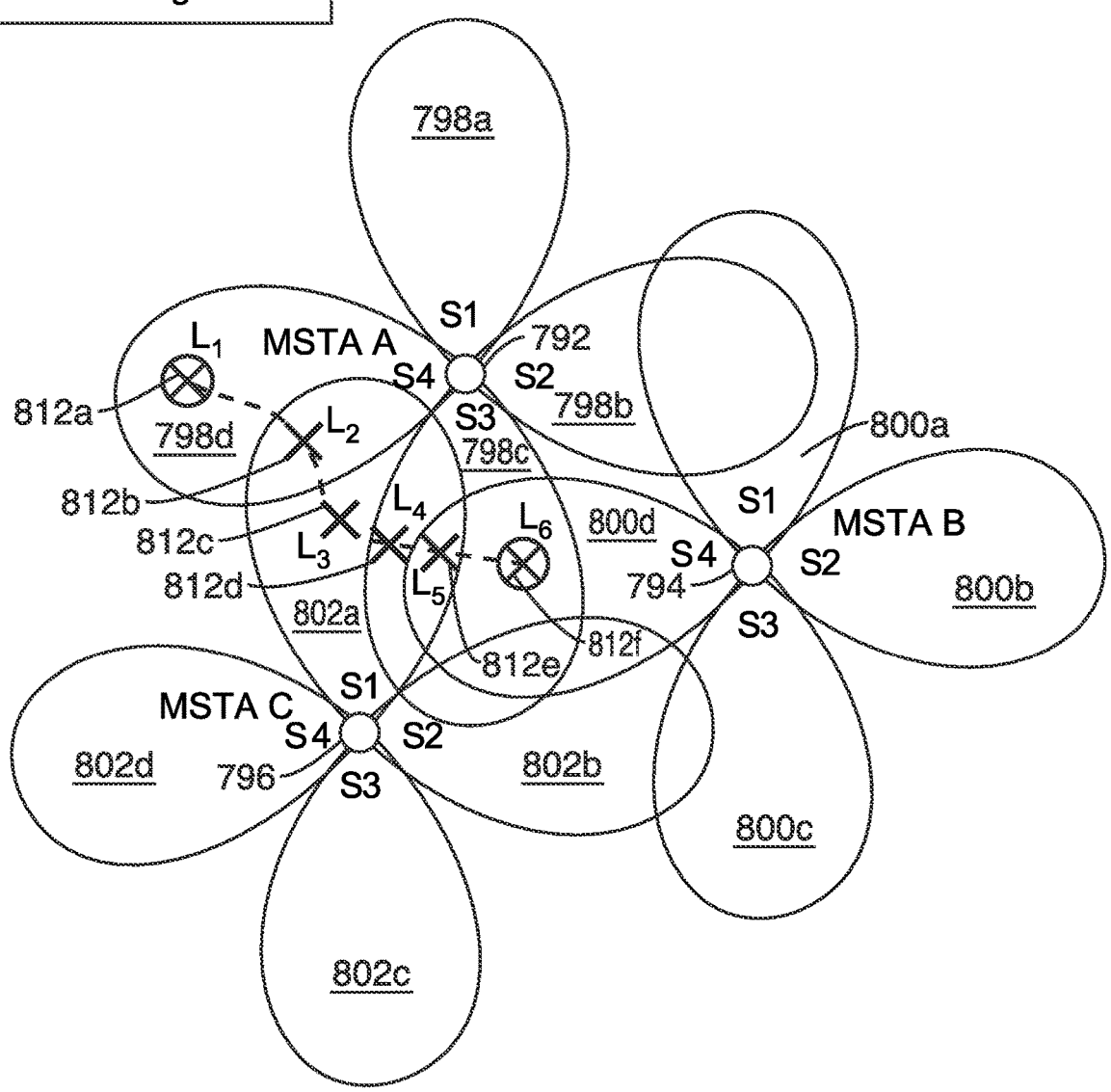
FIG. 29 is a node sector coverage diagram showing sector coverage between nodes with effects of movement of a new node through the coverage area as responded to according to an embodiment of the present disclosure.

FIG. 29 illustrates an example embodiment 810 as a variation of the case shown in FIG. 28, depicting the case of a node moving and forming new lists. These lists are used to update the geographical discovery zone set for these neighbors as shown in the table. The figure depicts node MSTA A 792 with sectors 798a through 798d, MSTA B 794 with sectors 800a through 800d, and MSTA C 796 with sectors 802a through 802d, depicting their overlapping antenna direction sectors. A mobile node is shown moving through the antenna sectors associated with the three fixed nodes, with mobile nodes intermediate locations seen as 812a through 812f, as new lists are created when the neighbor associations change from MSTA A 792 (S4) as sole neighbor at $L_1$ 812a, to neighbors MSTA A 792 (S4) and MSTA C 796 (S1) at $L_2$ 812b, to MSTA C 796 (S1) as sole neighbor at $L_3$ 812c, to MSTA A 792 (S3) and MSTA C 796 (S1) at $L_4$ 812d, to MSTA A 792 (S3), MSTA C 796 (S1), and MSTA B 794 (S4) at $L_5$ 812e, and finally to MSTA A 792 (S3) and MSTA B 794 (S4) at $L_6$ 812f.

Thus, the figure shows an example of a node moving and forming new lists, utilized to update the geographical discovery zone set for these neighbors. Table 1 details the neighbor list and discovery zone updates for the example of FIG. 29 for each of the moving node positions $L_1$ through $L_6$.

4.10. New Frame Format 4.10.1. mmW Network Announcement

This frame is sent on the sub-6 GHz band on a periodic basis from mesh STAs to announce the mmW communication capability of a node. Also this frame is used to announce the capability of the mmW RF and baseband and to include selected information to the new node to aid it in beamforming with the STA, such as reducing overhead and/or expediting the beamforming process.

In at least one embodiment, the network announcement frame comprises the following information: (a) SSID/SSID list—List of mmW SSID(s) the new STA trying to connect to; (b) DMG Capabilities—MSTA supported capabilities; (c) Mesh ID—Mesh ID element; and (d) Mesh Assistance— True if the mesh discovery assistance is optional.

4.10.2. mmW Network Announcement Response

This frame is sent on the sub-6 GHz band from a new node as a response to receiving a network announcement frame. This frame informs the mesh STA of the existence of a new node that is trying to connect to the mmW network. The response preferably communicates the capabilities of the mmW RF and baseband of the new node as well as any information which makes it easier for the new node to beamform with the STA, for example reducing the overhead of beamforming and/or expediting the process of beamforming.

In at least one embodiment, the network announcement response frame comprises the following information: (a) NSID—new STA identifier; (b) SSID—list of mmW SSID that the new STA is trying to connect to; (c) DMG Capabilities—new STA supported capabilities; (d) Mesh ID— mesh ID element; (e) Mesh Assistance—true if the mesh discovery assistance is requested.

4.10.3. mmW Network Announcement Acknowledgement

This frame is sent on the sub-6 GHz band from a mesh STA to a new node as an acknowledgment for receiving a network announcement response and to authorize a node to connect to the mmW network. This frame is used to inform the new STA of information regarding the discovery campaign scheduled on the mmW band.

In at least one embodiment, the network announcement acknowledgement frame comprises the following information: (a) NSID—an identifier for the New STA to be assisted; (b) SSID/SSID list—list of mmW SSID(s) the new STA trying to connect to; (c) Mesh Assistance—true if the mesh discovery assistance is enabled; (d) Channel—the channel where MSTA are transmitting discovery beacon; (e) Synchronization information—the time for new STA to expect mmW beacons; and (f) Localization information—information to aid new node in directing its beamforming in the STA direction.

4.10.4. mmW Network Joining Request

This frame is sent on the sub-6 GHz band from a new node to mesh STAs to announce its existence and to request mmW link establishment with neighboring nodes. Also this frame is used to announce the capability of the mmW RF and baseband and some information that makes it easier for the new node to beamform with the STA, such as mentioned previously in regards to lowering overhead, and/or expediting the beamforming process.

In at least one embodiment the network joining request frame comprises the following information: (a) NSID—identifier of new STA to be assisted; (b) DMG Capabilities—MSTA supported capabilities; (c) Mesh ID—Mesh ID element; and (d) Mesh Assistance—true if mesh discovery assistance is optional.

4.10.5. mmW Network Joining Response

This frame is sent on the sub-6 GHz band from a mesh STA to a new node as a response to a network joining request from a new STA. This frame is transmitted to inform the new STA of information regarding the discovery campaign scheduled on the mmW band.

In at least one embodiment the network joining response frame comprises the following information: (a) NSID—identifier for the new STA to be assisted; (b) SSID/SSID list—list of mmW SSID(s) the new STA trying to connect to; (c) Mesh Assistance—true if the mesh discovery assistance is enabled; (d) Channel—the Channel where MSTA are transmitting discovery beacon; (e) Synchronization information—the time for new STA to expect mmW beacons; and (f) Localization information—information to help the new node direct its beamforming in the STA direction.

4.10.6. mmW Authentication Request

This frame is sent on the sub-6 GHz band from a new node to mesh STAs to request authentication on the mmW network. This authorization operates to avoid any additional activity (e.g., new node assistance) on the mmW band if the new node is not authorized to access the mmW network.

In at least one embodiment the authentication request frame comprises the following information: (a) NSID—identifier for the new STA to be assisted; and (b) Authentication information—authentication information request.

4.10.7. mmW Authentication Response

This frame is sent on the sub-6 GHz band from one or more mesh STAs to a new node as a response to the mmW network authentication request. If mesh assistance is allowed, the mesh node will add other nodes in the geographical discovery zone of the new node to check if the new node is interested in discovering them on the mmW band.

In at least one embodiment, the authentication response frame comprises the following information: (a) NSID—identifier of the new STA to be assisted; (b) Authentication response—true or false; and (c) Mesh assistance list—list of nodes in the geographical discovery zone.

4.10.8. mmW Authentication Response ACK

This frame is sent on the sub-6 GHz band from a new node to mesh STAs to acknowledge the reception of the mmW network authentication response, toward avoiding any activity on the mmW band (e.g., new node assistance) if the new node is not authorized to access the mmW network. If mesh assistance is allowed, the new node preferably responds with a list of nodes it is interested to discover in the mmW network if the list was sent in the authentication response frame.

In at least one embodiment the authentication response ACK frame comprises the following information: (a) NSID—identifier of the new STA to be assisted; and (b) Mesh assistance list response—list of nodes in the geographical discovery zone that the new node is interested to discover on the mmW band.

4.10.9. Discovery Beacon

This is a frame that is similar to the regular 802.11 DMG beacons frames, but has some elements to support additional features. These frames are preferably transmitted in the mmW band by the MSTA in all directions to help in discovery and announcing the network. The frame contains specific details to allow new nodes to discover the network, and is different than the peer beacons which are intended to synchronize and manage mesh peers and connected STAs. Many element of the 802.11 DMG beacon can be removed or considered optional if it is not needed by the new node discovery. Once the node is connected to the mesh network it can receive all omitted information through peer beacons. This is a very light beacon and has the basic information for a node to discover the mesh node, form a connection and start receiving peer beacons.

The frame of an assistance response message also indicates the Beacon Type as being either a Discovery or peer beacon.

4.10.10. Peer Beacon

This is a frame that is similar to the regular 802.11 DMG beacons frames but has some elements to support additional features. These frames are transmitted by all nodes in the mmW band to their peer STAs in their directions or around their directions only. This peer beacon is used for beacon functions like synchronization, spectrum and channel management. The information communicated is intended for nodes in the network to manage the network and maintain synchronization in the network. Many elements of the 802.11 DMG beacon can be removed or considered optional if it is not required by the current mesh STA, and is just intended for new nodes discovery and mesh formation.

The frame of a peer beacon should at least contain information on Beacon Type, including whether it is a discovery beacon or peer beacon.

5. Summary

Wireless communication system/apparatus/method with directional transmission over mmW band which is also configured for transmission and reception on at least one sub-6 GHz band to aid scanning for mmW mesh network discovery. The programming of each node is configured to transmit reduced power mmW network announcement frames on the sub-6 GHz band to announce the existence of the mmW network and the capability of the mmW communication apparatus. The programming of each node is configured to receive reduced power mmW network joining request frames on the sub-6 GHz band which announce the existence of a node in the mmW band, its capabilities, and its request to the receiving mmW stations for assistance to find neighbors and join the network.

In addition to the above, in at least one embodiment, the system/apparatus/method is configured to utilize directional transmission for transmitting beacons to maintain existing links among its neighboring peer stations. These beacons are transmitted periodically and solely to neighboring peer STAs to maintain synchronization and manage resources. These mmW beacons are not transmitted in all directions all the time.

In addition to the above in at least one embodiment, a new station (STA) in search of network neighbors is configured for receiving a reduced power mmW network announcement frame on the sub-6 GHz band from a network station, to which the new station responds by sending a sub-6 GHz message to inform the network station (STA) of its existence. After which the new station switches to communicating on the mmW band to discover neighbor(s).

In addition to the above in at least one embodiment, a station receiving a reduced power mmW network joining request frame on the sub-6 GHz band from a new station is configured to respond to the new station and communicate information about the mmW network. The new station is configured to switch to the mmW band to discover neighbor(s).

In addition to the above in at least one embodiment, stations in the mmW network that communicated with the new node through the sub-6 GHz band assist the new station by transmitting mmW beacons in all directions and beamforming with the new station if it is within a coverage area of the mmW network.

In addition to the above in at least one embodiment, stations in the network which communicated with the new station through the sub-6 GHz band coordinate with other stations that are potential neighbors in the mmW network to assist the new station by transmitting mmW beacons in all directions and beamforming with the new station if it is within a coverage area of the mmW network.

The enhancements described in the presented technology can be readily implemented within various mmWave transmitters, receivers and transceivers. It should also be appreciated that modern transmitters, receivers and transceivers are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in the diagrams for the sake of simplicity of illustration, as one of ordinary skill in the art recognizes the use of computer devices for carrying out steps involved with various modern communication devices. The presented technology is non-limiting with regard to memory and computer-readable media, insofar as these are non-transitory, and thus not constituting a transitory electronic signal.

It will also be appreciated that the computer readable media (memory storing instructions) in these computational systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a mesh network, comprising: (a) a wireless communication circuit configured for wirelessly communicating with other wireless communication stations utilizing both: (A) directional millimeter-wave (mmW) communication having a plurality of antenna pattern sectors each having different transmission directions, and (B) sub-6 GHz wireless communication; (b) a processor coupled to said wireless communication circuit within a station configured for operating on the mesh network; (c) a non-transitory memory storing instructions executable by the processor; and (d) wherein said instructions, when executed by the processor, perform steps comprising: (d)(i) operating said station as a peer station on said mesh network for maintaining communications with neighboring peer stations on the mesh network; (d)(ii) transmitting a first type of beacon, a peer beacon, using said directional millimeter-wave communication having a plurality of antenna pattern sectors comprising time synchronization and resource management information, to maintain existing links among one or more neighboring peer stations within the mesh network; (d)(iii) transmitting, from the peer station, a second type of beacon, as a network discovery beacon, over said sub-6 GHz wireless communication, in which said network discovery beacon contains mesh network profile information which identifies the mesh network, to aid network discovery for a new station to join the mesh network; and (d)(iv) receiving joining request frames for said mesh network over said sub-6 GHz wireless communication, said joining request announces the new station along with capabilities of the new station and a request from the new station to any receiving stations of the mesh network requesting assistance in finding neighbors and joining the mesh network.

2. An apparatus for wireless communication in a mesh network, comprising: (a) a wireless communication circuit configured for wirelessly communicating with other wireless communication stations utilizing both: (A) directional millimeter-wave (mmW) communication having a plurality of antenna pattern sectors each having different transmission directions, and (B) sub-6 GHz wireless communication; (b) a processor coupled to said wireless communication circuit within a station configured for operating on the mesh network; (c) a non-transitory memory storing instructions executable by the processor; and (d) wherein said instructions, when executed by the processor, perform steps comprising: (d)(i) operating said station as a peer station on said mesh network for maintaining communications with neighboring peer stations on the mesh network; (d)(ii) transmitting a first type of beacon, a peer beacon, using said directional millimeter-wave communication having a plurality of antenna pattern sectors comprising time synchronization and resource management information, to maintain existing links among one or more neighboring peer stations within the mesh network; (d)(iii) transmitting, from the peer station, a second type of beacon, as a network discovery beacon, over said sub-6 GHz wireless communication, in which said network discovery beacon contains mesh network profile information which identifies the mesh network, to aid network discovery for a new station to join the mesh network; (d)(iv) receiving joining request frames for said mesh network over said sub-6 GHz wireless communication, said joining request announces the new station along with capabilities of the new station and a request from the new station to any receiving stations of the mesh network requesting assistance in finding neighbors and joining the mesh network; (d)(v) operating said station as the new station if said station has not yet joined the mesh network, wherein the new station is configured for receiving a network announcement frame over said sub-6 GHz wireless communication from a sending station connected as a peer station on the mesh network, and responding by transmitting a response message over said sub-6 GHz wireless communication to inform the sending station of its existence; and (d) (vi) switching the new station to using directional millimeter-wave (mmW) communication for discovering one or more neighbors on the mesh network.

3. A method for performing wireless communication in a mesh network, comprising: (a) generating wireless communications, controlled by a processor of a station, as both directional millimeter-wave (mmW) communication having a plurality of antenna pattern sectors each having different transmission directions, and using sub-6 GHz wireless communication; (b) operating the station on said mesh network as a peer station for maintaining communications with neighboring peer stations on the mesh network; (c) transmitting a first type of beacon, a peer beacon, using said directional millimeter-wave communication having a plurality of antenna pattern sectors comprising time synchronization and resource management information, to maintain existing links among one or more neighboring peer stations within the mesh network; (d) transmitting, from the peer station, a second type of beacon, as a network discovery beacon, over said sub-6 GHz wireless communication, in which said network discovery beacon contains mesh network profile information which identifies the mesh network, to aid network discovery for a new station to join the mesh network; and (e) receiving joining request frames for said mesh network over said sub-6 GHz wireless communication, said joining request announces the new station along with capabilities of the new station and a request from the new station to any receiving stations of the mesh network requesting assistance in finding neighbors and joining the mesh network.

4. The apparatus or method of any preceding embodiment, wherein said instructions when executed by the processor further perform steps comprising operating said station as the new station if said station has not yet joined the mesh network, wherein the new station is configured for receiving a network announcement frame over said sub-6 GHz wireless communication from a sending station connected as a peer station on the mesh network, and responding by transmitting a response message over said sub-6 GHz wireless communication to inform the sending station of its existence.

5. The apparatus or method of any preceding embodiment, wherein said instructions when executed by the processor further perform steps comprising switching the new station for directional millimeter-wave (mmW) communication for discovering one or more neighbors on the mesh network.

6. The apparatus or method of any preceding embodiment, wherein said instructions when executed by the processor further perform steps comprising operating said station as a peer station and communicating with the new station over said sub-6 GHz wireless communication to assist the new station by transmitting millimeter-wave beacons in all directions and beamforming with the new station if it is within a coverage area of the mesh network.

7. The apparatus or method of any preceding embodiment, wherein said instructions when executed by the processor further perform steps comprising operating said station as a peer station and coordinating with peer stations, that are potential neighbors of the new station in the mesh network, in assisting the new station by transmitting millimeter-wave beacons in all directions and beamforming with the new station if it is within a coverage area of the mesh network.

8. The apparatus or method of any preceding embodiment, wherein said instructions when executed by the processor further perform steps comprising performing authentication in which a new node sends an authentication request for the mesh network over said sub-6 GHz wireless communication, and if authentication is successful, the new node switches to the directional millimeter-wave (mmW) communication for beamforming.

9. The apparatus or method of any preceding embodiment, wherein said instructions when executed by the processor further perform steps comprising peer stations on the mesh network configured for responding to said authentication request from the new node by sending a response to the new node.

10. The apparatus or method of any preceding embodiment, wherein said instructions when executed by the processor further perform steps comprising peer stations on the mesh network configured for sending said response to the new node which includes additional information for use by the new node.

11. The apparatus or method of any preceding embodiment, wherein said instructions when executed by the processor further perform steps comprising peer stations on the mesh network configured for sending said response to the new node in which said additional information comprises a list of other neighboring nodes on the mesh network.

12. The apparatus or method of any preceding embodiment, wherein said instructions when executed by the processor further perform steps comprising operating said station as a peer station and communicating with the new station over said sub-6 GHz wireless communication to assist the new station by transmitting millimeter-wave beacons in all directions and beamforming with the new station if it is within a coverage area of the mesh network.

13. The apparatus or method of any preceding embodiment, wherein said instructions when executed by the processor further perform steps comprising operating said station as a peer station and coordinating with peer stations, that are potential neighbors of the new station in the mesh network, in assisting the new station by transmitting millimeter-wave beacons in all directions and beamforming with the new station if it is within a coverage area of the mesh network.

14. The apparatus or method of any preceding embodiment, wherein said instructions when executed by the processor further perform steps comprising performing authentication in which a new node sends an authentication request for the mesh network over said sub-6 GHz wireless communication, and if authentication is successful, the new node switches to the directional millimeter-wave (mmW) communication for beamforming.

15. The apparatus or method of any preceding embodiment, wherein said instructions when executed by the processor further perform steps comprising peer stations on the mesh network configured for responding to said authentication request from the new node by sending a response to the new node.

16. The apparatus or method of any preceding embodiment, wherein said instructions when executed by the processor further perform steps comprising peer stations on the mesh network configured for sending said response to the new node which includes additional information for use by the new node.

17. The apparatus or method of any preceding embodiment, wherein said instructions when executed by the processor further perform steps comprising peer stations on the mesh network configured for sending said response to the new node in which said additional information comprises a list of other neighboring nodes on the mesh network.

18. The apparatus or method of any preceding embodiment, further comprising operating said station as the new station if said station has not yet joined the mesh network, wherein the new station is configured for receiving a network announcement frame over said sub-6 GHz wireless communication from a sending station connected as a peer station on the mesh network, and responding by transmitting a response message over said sub-6 GHz wireless communication to inform the sending station of its existence.

19. The apparatus or method of any preceding embodiment, wherein said instructions when executed by the processor further perform steps comprising switching the new station for directional millimeter-wave (mmW) communication for discovering one or more neighbors on the mesh network.

20. The apparatus or method of any preceding embodiment, wherein the new node sends an authentication request for the mesh network over said sub-6 GHz wireless communication, and if authentication is successful, the new node switches to the directional millimeter-wave (mmW) communication for beamforming.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

cons transmitted in all directions to help in discovery and announcing said network; (C) wherein both types of beacons contain a field indicating which type of beacon is being sent;

(iii) limiting network access to those new stations which can be accessed with a direct mmW link by: (A) sending announcement frames with a power level which is lowered to reflect mmW link budget; or (B) establishing a receiving threshold for announcement frames transmitted with full power, in which said threshold determines to not respond to this frame if it will be considered outside a mmW mesh node coverage area;

(iv) aiding network discovery, by supporting passive and/or active scanning in the process of allowing a new station to join said network;

(v) transmitting a network announcement acknowledgement on the lower band from said station on said network, to said new station, as an acknowledgment for receiving a network announcement response, wherein said network announcement acknowledgement authorizes said new station to connect to said

TABLE 1

Discovery Zone Formation Exemplified in FIG. 33

| List | $L_1$ | $L_2$ | $L_3$ | $L_4$ | $L_5$ | $L_6$ |
|---|---|---|---|---|---|---|
| Neighbor list | A-S4 | A-S4, C-S1 | C-S1 | C-S1, A-S3 | C-S1, B-S4, A-S3 | B-S4, A-S3 |
| Discovery zone update | A-S4 = { } | A-S4 = {C-S1} | A-S4 = {C-S1} | A-S4 = {C-S1} | A-S4 = {C-S1} | A-S4 = {C-S1} |
| | A-S3 = { } | A-S3 = { } | A-S3 = { } | A-S3 = {C-S1} | A-S3 = {C-S1, B-S4} | A-S3 = {C-S1, B-S4} |
| | C-S1 = { } | C-S1 = {A-S4} | C-S1 = {A-S4} | C-S1 = {A-S4, A-S3} | C-S1 = {A-S4, A-S3, B-S4} | C-S1 = {A-S4, A-S3, B-S4} |
| | B-S4 = { } | B-S4 = { } | B-S4 = { } | B-S4 = { } | B-S4 = {C-S1, A-S3} | B-S4 = {C-S1, A-S3} |

What is claimed is:

1. An apparatus for wireless communication in a network, comprising:

(a) a wireless communication circuit, as a station, operating under IEEE 802.11 and configured for wirelessly communicating with other wireless communication stations utilizing both: (A) directional millimeter-wave (mmW) communication in a mmW band having a plurality of antenna pattern sectors each having different transmission directions, and (B) lower band wireless communication in a lower band;

(b) a processor coupled to said wireless communication circuit within said station configured for operating on the network;

(c) a non-transitory memory storing instructions executable by the processor; and (d) wherein said instructions, when executed by the processor, perform steps comprising:

(i) operating said station on said network for maintaining communications with neighboring stations on said network;

(ii) transmitting beacons using said directional millimeter-wave (mmW) communication on a subset of said plurality of antenna pattern sectors for receipt by stations that are in communication with said station sending said beacons or are nearby, said beacons comprising: (A) sending a first type of beacon to neighboring stations on the network for managing spectrum and synchronization of the channel; (B) sending a second type of beacon as discovery beanetwork using millimeter-wave (mmW) communications, and to inform said new station of information regarding a discovery campaign scheduled on the mmW band;

(vi) wherein said station in response to lower band communications from said new station to join said network, switches to the mmW band and performs beamforming between said new station and other stations already joined on said network; and (vii) transmitting updates with information on new sets of stations and sectors that can be discovered as stations are moving and discovering new stations, since certain stations are discovering and/or losing sight with other stations and forming new lists of neighbors.

2. The apparatus of claim 1, wherein said instructions when executed by the processor further perform steps comprising operating said wireless communication circuit as said new station:

(a) requesting network discovery, by passive and/or active scanning, for said new station to join the network, wherein said new station: (i) performs passive scanning as it receives an announcement frame about the existence of said network using directional mmW communications, over the lower band, and responds by sending an announcement request on the lower band to join said network; and/or (ii) performs active scanning by sending an announcement request over the lower band, in which said announcement request from said new station requests to join said directional mmW network and contains information on directional mmW capability of said new station; and (b) wherein said new station and one or more other network stations, in response to lower band communications, switches to the mmW band with beamforming being performed between said new station and other stations already joined on said network, and the request to join said network is processed.

3. The apparatus of claim 2, wherein said instructions when executed by the processor further perform steps comprising switching said new station for directional mmW communication for discovering one or more other neighbor stations said network.

4. The apparatus of claim 1, wherein said instructions when executed by the processor further perform steps comprising communicating with said new station over said lower band to assist said new station by transmitting millimeter-wave beacons, or beamforming beacons, or beamforming sessions in the DTI, in all directions and beamforming with said new station if it is within a coverage area of said network.

5. The apparatus of claim 4, wherein said instructions when executed by the processor further perform steps comprising operating said station for coordinating with other stations that are potential neighbor stations of said new station in said network, toward assisting said new station by transmitting mmW beacons, or beamforming beacons, or beamforming sessions in the DTI, beacons, or beamforming sessions in the DTI, in all directions and beamforming with said new station if it is within a coverage area of said network.

6. The apparatus of claim 5, wherein during said coordinating with other stations a sequence or time is determined for which these stations will reach out to the new node.

7. The apparatus of claim 1, wherein said instructions when executed by the processor further perform steps comprising performing authentication in which said new station sends an authentication request for said network over said lower band, and if authentication is successful, said new station switches to the mmW band for beamforming.

8. The apparatus of claim 7, wherein said instructions when executed by the processor further perform steps comprising responding to said authentication request from said new station by neighboring stations which are configured for sending a response to said new station.

9. The apparatus of claim 8, wherein said instructions when executed by the processor further perform steps comprising sending said response to said new station, wherein said response includes additional information for use by said new station.

10. The apparatus of claim 9, wherein said instructions when executed by the processor further perform steps comprising sending said response to said new station in which said additional information comprises a list of other neighboring stations on said network.

11. The apparatus of claim 1, wherein said first type of beacon is sent to neighboring stations on the network for managing spectrum and synchronization of the channel, by transmissions directed to the best sectors for these other stations.

12. The apparatus of claim 1, wherein said best sectors for these other stations are bracketed by transmissions to sector around the determined best sector.

13. The apparatus of claim 1, wherein a determination of which stations are contacted, for said discovery campaign scheduled on the mmW band for the new station, is based on a determination of geographical discovery zone.

14. The apparatus of claim 13, wherein said geographical discovery zone contains other stations or sectors that might be seen by any new node discovered by or in this sector, and thus represents all possible potential neighbors.

15. The apparatus of claim 13, wherein said geographical discovery zone can be determined through measurement reporting on the network, or by utilizing an analytical cell planning process.

16. The apparatus of claim 13, wherein said geographical discovery zone is formed in a centralized procedure in which other stations are sending neighbor lists to a central entity which processes the collected neighbors lists, and sends information on geographic discovery zone sets to these other stations.

17. The apparatus of claim 13, wherein said geographical discovery zone is formed in a distributed procedure in which each station is sending its neighbor lists to all members of its list, and each station adds all members of neighbor lists to the geographic discovery zone of the sector that it was received from.

18. An apparatus for wireless communication in a network, comprising:

(a) a wireless communication circuit, as a station, operating under IEEE 802.11 and configured for wirelessly communicating with other wireless communication stations utilizing both: (A) directional millimeter-wave (mmW) communication in a mmW band having a plurality of antenna pattern sectors each having different transmission directions, and (B) lower band wireless communication in a lower band;

(b) a processor coupled to said wireless communication circuit within said station configured for operating on the network;

(c) a non-transitory memory storing instructions executable by the processor; and (d) wherein said instructions, when executed by the processor, perform steps comprising:

(i) operating said station on said network for maintaining communications with neighboring stations on said network;

(ii) transmitting beacons using said directional millimeter-wave (mmW) communication on a subset of said plurality of antenna pattern sectors for receipt by stations that are in communication with said station sending said beacons or are nearby, said beacons comprising (A) sending a first type of beacon to neighboring stations on the network for managing spectrum and synchronization of the channel; (B) sending a second type of beacon as discovery beacons transmitted in all directions to help in discovery and announcing said network; (C) wherein both types of beacons contain a field indicating which type of beacon is being sent;

(iii) limiting network access to those new stations which can be accessed with a direct mmW link by sending announcement frames with a power level which is lowered to reflect mmW link budget;

(iv) aiding network discovery, by supporting passive and/or active scanning in the process of allowing a new station to join said network;

(v) transmitting a network announcement acknowledgement on the lower band from said station on said network, to said new station, as an acknowledgment for receiving a network announcement response, wherein said network announcement acknowledgement authorizes said new station to connect to said network using millimeter-wave (mmW) communications, and to inform said new station of information regarding a discovery campaign scheduled on the mmW band;

(vi) wherein a determination of which stations are contacted, for participation in said discovery campaign scheduled on the mmW band for the new station, is based on a determination of geographical discovery zone;

(vii) wherein said station in response to lower band communications from said new station to join said network, switches to the mmW band and performs beamforming between said new station and other stations already joined on said network; and (viii) transmitting updates with information on new sets of stations and sectors that can be discovered as stations are moving and discovering new stations, since certain stations are discovering and/or losing sight with other stations and forming new lists of neighbors.

19. The apparatus of claim 18:

wherein said geographical discovery zone can be determined through measurement reporting on the network, or by utilizing an analytical cell planning process; and wherein said geographical discovery zone can be determined in either: (a) a centralized process where a central entity processes collected neighbor lists, or (b) a distributed procedure in which stations send their neighbor lists to all members of its list to determine geographical discovery zone.

20. A method for performing wireless communication in a network, comprising:

(a) generating wireless communications operating under IEEE 802.11 and controlled by a processor of a station, utilizing both: (i) directional millimeter-wave (mmW) communication in a mmW band having a plurality of antenna pattern sectors each having different transmission directions, and (ii) lower band wireless communication in a lower band;

(b) operating said station on said network for maintaining communications with neighboring stations on said network;

(c) transmitting beacons using said directional millimeter-wave (mmW) communication on a subset of said plurality of antenna pattern sectors for receipt by other stations that are in communication with said station sending said beacons or are nearby, said beacons comprising (A) sending a first type of beacon to neighboring stations on the network for managing spectrum and synchronization of the channel; (B) sending a second type of beacon as discovery beacons transmitted in all directions to help in discovery and announcing said network; (C) wherein both types of beacons contain a field indicating which type of beacon is being sent;

(d) limiting network access to those new stations which can be accessed with a direct mmW link by: (A) sending announcement frames with a power level which is lowered to reflect mmW link budget; or (B) establishing a receiving threshold for announcement frames transmitted with full power, in which said threshold determines to not respond to this frame if it will be considered outside a mmW mesh node coverage area;

(e) aiding network discovery, by passive and/or active scanning, in the process of allowing a new station to join said network;

(f) transmitting a network announcement acknowledgement on the lower band from said station on said network to said new station, as an acknowledgment for receiving a network announcement response, wherein said network announcement acknowledgement authorizes said new station to connect to said network using millimeter-wave (mmW) communications, and to inform said new station of information regarding a discovery campaign scheduled on the mmW band;

(g) wherein said station in response to lower band communications from said new station to join the network, switches to the mmW band and performs beamforming between said new station and other stations already joined on said network; and (h) transmitting updates with information on new sets of stations and sectors that can be discovered as stations are moving and discovering new stations, since certain stations are discovering and/or losing sight with other stations and forming new lists of neighbors.

* * * * *